United States Patent
Berkowitz et al.

(10) Patent No.: US 10,574,079 B1
(45) Date of Patent: Feb. 25, 2020

(54) WIRELESS CHARGING TECHNIQUES AND CIRCUITRY FOR A BATTERY

(71) Applicant: Qnovo Inc., Newark, CA (US)

(72) Inventors: Fred Berkowitz, Los Gatos, CA (US);
Mark Gurries, San Jose, CA (US);
Bryan McLaughlin, San Francisco, CA (US)

(73) Assignee: Qnovo Inc., Newark, CA (US)

( * ) Notice: Subject to any disclaimer, the term of this patent is extended or adjusted under 35 U.S.C. 154(b) by 255 days.

(21) Appl. No.: 14/743,769

(22) Filed: Jun. 18, 2015

Related U.S. Application Data

(60) Provisional application No. 62/015,072, filed on Jun. 20, 2014.

(51) Int. Cl.
| | |
|---|---|
| *H02J 7/02* | (2016.01) |
| *H02J 7/04* | (2006.01) |
| *H02J 7/00* | (2006.01) |
| *H02J 50/80* | (2016.01) |
| *H02J 50/90* | (2016.01) |
| *H02J 50/70* | (2016.01) |

(52) U.S. Cl.
CPC ............ *H02J 7/025* (2013.01); *H02J 7/0044* (2013.01); *H02J 7/042* (2013.01); *H02J 50/70* (2016.02); *H02J 50/80* (2016.02); *H02J 50/90* (2016.02)

(58) Field of Classification Search
CPC .. H02J 7/025; H02J 50/00; H02J 50/80; H02J 50/10
USPC .......................................... 320/108; 307/104
See application file for complete search history.

(56) References Cited

U.S. PATENT DOCUMENTS

| | | | |
|---|---|---|---|
| 4,680,241 A | 7/1987 | Dyer | |
| 4,829,225 A | 5/1989 | Podrazhansky et al. | |
| 5,410,238 A | 4/1995 | Ishizuka et al. | |
| 5,442,274 A | 8/1995 | Tamai | |
| 5,500,583 A | 3/1996 | Buckley et al. | |
| 5,684,386 A | 11/1997 | Okada | |
| 5,747,969 A | 5/1998 | Tamai | |
| 5,773,955 A * | 6/1998 | Hall ..................... | H02J 7/0093 320/104 |

(Continued)

FOREIGN PATENT DOCUMENTS

| | | |
|---|---|---|
| CN | 1985183 A | 6/2007 |
| CN | 102577009 A | 7/2012 |

(Continued)

OTHER PUBLICATIONS

U.S. Office Action dated Jun. 18, 2013 issued in U.S. Appl. No. 13/111,902.

(Continued)

*Primary Examiner* — David V Henze-Gongola
*Assistant Examiner* — Tarikh Kanem Rankine
(74) *Attorney, Agent, or Firm* — Weaver Austin Villeneuve & Sampson LLP

(57) ABSTRACT

A wireless charging system for charging a battery may include wireless charging circuitry based on inductive coupling, where the wireless charging circuitry includes: control circuitry for adaptively charging or charging a battery/cell; and an output of the charging circuitry configured to apply an adapted, unregulated current and/or voltage to the battery. In certain embodiments, the adaptation of the unregulated current and/or voltage is based on the charging and/or operating conditions of the battery.

19 Claims, 22 Drawing Sheets

(56) References Cited

U.S. PATENT DOCUMENTS

| | | |
|---|---|---|
| 5,808,447 A | 9/1998 | Hagino |
| 5,888,665 A | 3/1999 | Bugga et al. |
| 5,900,718 A | 5/1999 | Tsenter |
| 5,905,364 A | 5/1999 | Ookita |
| 5,923,149 A | 7/1999 | Umetsu |
| 5,945,811 A | 8/1999 | Hasegawa et al. |
| 5,982,152 A | 11/1999 | Watanabe et al. |
| 5,994,875 A | 11/1999 | Lee |
| 6,040,685 A | 3/2000 | Tsenter et al. |
| 6,043,631 A | 3/2000 | Tsenter |
| 6,074,771 A | 6/2000 | Cobukcu et al. |
| 6,094,033 A | 7/2000 | Ding et al. |
| 6,097,172 A | 8/2000 | Podrazhansky et al. |
| 6,127,804 A | 10/2000 | Oglesbee et al. |
| 6,127,809 A | 10/2000 | Kates et al. |
| 6,137,265 A | 10/2000 | Cummings et al. |
| 6,144,187 A | 11/2000 | Bryson |
| 6,154,011 A | 11/2000 | Lam et al. |
| 6,194,867 B1 | 2/2001 | Cummings et al. |
| 6,204,634 B1 | 3/2001 | Zimmerman et al. |
| 6,215,281 B1 | 4/2001 | Koch |
| 6,259,231 B1 | 7/2001 | Hansen |
| 6,262,577 B1 | 7/2001 | Nakao et al. |
| 6,307,353 B1 | 10/2001 | Shiojima |
| 6,313,605 B1 | 11/2001 | Tsenter |
| 6,362,598 B2 | 3/2002 | Laig-Horstebrock et al. |
| 6,366,056 B1 | 4/2002 | Podrazhansky et al. |
| 6,377,028 B1 | 4/2002 | Armstrong, II et al. |
| 6,441,585 B1 | 8/2002 | Bertness |
| 6,441,586 B1 | 8/2002 | Tate, Jr. et al. |
| 6,456,988 B1 | 9/2002 | Singh et al. |
| 6,469,471 B1 | 10/2002 | Anbuky et al. |
| 6,532,425 B1 | 3/2003 | Boost et al. |
| 6,630,814 B2 | 10/2003 | Ptasinski et al. |
| 6,631,293 B2 | 10/2003 | Lyden |
| 6,646,419 B1 | 11/2003 | Ying |
| 6,707,272 B1 | 3/2004 | Thandiwe |
| 6,789,026 B2 | 9/2004 | Barsoukov et al. |
| 6,832,171 B2 | 12/2004 | Barsoukov et al. |
| 6,833,686 B2 | 12/2004 | Veselic et al. |
| 6,841,974 B2 | 1/2005 | Dykeman |
| 6,892,148 B2 | 5/2005 | Barsoukov et al. |
| 6,924,622 B1 | 8/2005 | Anbuky et al. |
| 7,005,830 B2 | 2/2006 | Moore et al. |
| 7,034,503 B2 | 4/2006 | Veselic et al. |
| 7,072,871 B1 | 7/2006 | Tinnemeyer |
| 7,180,298 B2 | 2/2007 | Nakamura et al. |
| 7,199,557 B2 | 4/2007 | Anbuky et al. |
| 7,205,748 B2 | 4/2007 | Nishida et al. |
| 7,227,336 B1 | 6/2007 | van-Schalkwijk et al. |
| 7,245,107 B2 | 7/2007 | Moore et al. |
| 7,248,023 B2 | 7/2007 | Takezawa et al. |
| 7,324,902 B2 | 1/2008 | Verbrugge et al. |
| 7,362,074 B2 | 4/2008 | Iwane et al. |
| 7,402,980 B2 | 7/2008 | Al-Anbucky et al. |
| 7,405,538 B1* | 7/2008 | Hoff .................. H02J 9/062 |
| | | 320/150 |
| 7,492,130 B2 | 2/2009 | Daboussi |
| 7,557,541 B2 | 7/2009 | Marinka-Tóth et al. |
| 7,570,015 B2 | 8/2009 | Bansal et al. |
| 7,595,611 B2 | 9/2009 | Reynier et al. |
| 7,626,394 B2 | 12/2009 | Kimura et al. |
| 7,737,665 B2 | 6/2010 | Grewe et al. |
| 7,772,804 B2 | 8/2010 | Bhardwaj et al. |
| 7,788,052 B2 | 8/2010 | Iwane et al. |
| 8,036,839 B2 | 10/2011 | Machiyama et al. |
| 8,040,106 B2 | 10/2011 | Ishikawa |
| 8,044,635 B2* | 10/2011 | Peterson .............. A61N 1/3787 |
| | | 320/114 |
| 8,159,183 B2* | 4/2012 | Choi .................. H02J 7/025 |
| | | 320/108 |
| 8,244,177 B2* | 8/2012 | Zyambo .................. H02J 5/005 |
| | | 343/895 |
| 8,350,531 B2 | 1/2013 | Morimoto et al. |
| 8,368,357 B2 | 2/2013 | Ghantous et al. |
| 8,427,112 B2* | 4/2013 | Ghantous .......... G01R 31/3637 |
| | | 320/137 |
| 8,513,921 B2 | 8/2013 | Berkowitz et al. |
| 8,531,158 B2 | 9/2013 | Wang et al. |
| 8,638,070 B2 | 1/2014 | Maluf et al. |
| 8,791,669 B2 | 7/2014 | Ghantous et al. |
| 8,963,494 B2 | 2/2015 | Kishiyama et al. |
| 8,970,178 B2 | 3/2015 | Berkowitz et al. |
| 8,975,874 B2 | 3/2015 | Berkowitz et al. |
| 9,035,621 B2 | 5/2015 | Berkowitz et al. |
| 9,035,623 B1 | 5/2015 | Berkowitz et al. |
| 9,063,018 B1 | 6/2015 | Ghantous et al. |
| 9,121,910 B2 | 9/2015 | Maluf et al. |
| 9,142,994 B2 | 9/2015 | Berkowitz et al. |
| 9,263,900 B2* | 2/2016 | Ju .................. H02J 7/0029 |
| 9,270,134 B2* | 2/2016 | Gaddam .................. H02J 7/007 |
| 9,373,972 B2 | 6/2016 | Ghantous et al. |
| 9,385,555 B2 | 7/2016 | Ghantous et al. |
| 9,461,492 B1 | 10/2016 | Berkowitz et al. |
| 9,702,940 B2 | 7/2017 | Maluf et al. |
| 9,726,554 B1 | 8/2017 | Ghantous et al. |
| 9,787,122 B2 | 10/2017 | Berkowitz et al. |
| 9,791,513 B2 | 10/2017 | Maluf et al. |
| 10,067,198 B2 | 9/2018 | Maluf et al. |
| 10,128,678 B2 | 11/2018 | Berkowitz et al. |
| 10,389,156 B2 | 8/2019 | Berkowitz et al. |
| 2001/0011881 A1 | 8/2001 | Emori et al. |
| 2001/0017243 A1 | 8/2001 | Tajima et al. |
| 2002/0001745 A1 | 1/2002 | Gartstein et al. |
| 2002/0070706 A1 | 6/2002 | Champlin |
| 2002/0075003 A1 | 6/2002 | Fridman et al. |
| 2002/0109504 A1 | 8/2002 | Champlin |
| 2002/0117997 A1 | 8/2002 | Feil et al. |
| 2003/0003363 A1 | 1/2003 | Daido et al. |
| 2003/0206021 A1 | 11/2003 | Laletin et al. |
| 2004/0032237 A1 | 2/2004 | Dykeman |
| 2004/0038087 A1 | 2/2004 | Shiue et al. |
| 2005/0156577 A1 | 7/2005 | Sully |
| 2005/0189948 A1 | 9/2005 | Koch |
| 2005/0194938 A1 | 9/2005 | Sanpei |
| 2005/0214646 A1 | 9/2005 | Kubota |
| 2005/0248314 A1 | 11/2005 | James |
| 2005/0264263 A1 | 12/2005 | Tsenter |
| 2006/0001406 A1 | 1/2006 | Matan |
| 2006/0093894 A1 | 5/2006 | Scott et al. |
| 2006/0145658 A1 | 7/2006 | Wang |
| 2006/0181245 A1 | 8/2006 | Mizuno et al. |
| 2006/0186890 A1 | 8/2006 | Iwane et al. |
| 2006/0208701 A1 | 9/2006 | Mikhaylik |
| 2006/0238168 A1 | 10/2006 | Matsuo et al. |
| 2007/0132456 A1 | 6/2007 | Salman et al. |
| 2007/0170890 A1 | 7/2007 | Fee et al. |
| 2007/0194756 A1 | 8/2007 | Cutrona |
| 2007/0216359 A1 | 9/2007 | Arai et al. |
| 2007/0229034 A1 | 10/2007 | Tatebayashi et al. |
| 2007/0236225 A1 | 10/2007 | Tsenter et al. |
| 2007/0257681 A1 | 11/2007 | Christophersen et al. |
| 2008/0003490 A1 | 1/2008 | Christensen et al. |
| 2008/0079396 A1* | 4/2008 | Yamazaki .......... G06K 19/0702 |
| | | 320/128 |
| 2008/0079397 A1 | 4/2008 | Fee et al. |
| 2008/0211459 A1 | 9/2008 | Choi |
| 2009/0027006 A1 | 1/2009 | Vezzini et al. |
| 2009/0027007 A1 | 1/2009 | Iwane et al. |
| 2009/0027056 A1 | 1/2009 | Huang et al. |
| 2009/0146664 A1 | 6/2009 | Zhang |
| 2009/0195214 A1 | 8/2009 | Gehrke et al. |
| 2009/0212626 A1 | 8/2009 | Snyder et al. |
| 2009/0256528 A1 | 10/2009 | Greening et al. |
| 2009/0259420 A1 | 10/2009 | Greening et al. |
| 2009/0273320 A1 | 11/2009 | Ungar et al. |
| 2009/0295337 A1 | 12/2009 | Ishikawa |
| 2009/0325056 A1 | 12/2009 | Greening et al. |
| 2009/0326842 A1 | 12/2009 | Thomas-Alyea |
| 2010/0000809 A1 | 1/2010 | Nishi et al. |
| 2010/0039116 A1 | 2/2010 | Tsenter et al. |
| 2010/0060240 A1 | 3/2010 | Karoui et al. |
| 2010/0066310 A1 | 3/2010 | Biggs, Jr. |
| 2010/0072951 A1 | 3/2010 | Nakashima |

(56) References Cited

U.S. PATENT DOCUMENTS

| | | |
|---|---|---|
| 2010/0072955 A1 | 3/2010 | Ishikawa |
| 2010/0085022 A1 | 4/2010 | Shimizu et al. |
| 2010/0109443 A1* | 5/2010 | Cook .................. H01Q 1/2225 307/104 |
| 2010/0134305 A1 | 6/2010 | Lu et al. |
| 2010/0164437 A1 | 7/2010 | McKinley et al. |
| 2010/0213901 A1 | 8/2010 | Morimoto et al. |
| 2010/0219795 A1 | 9/2010 | Morimoto et al. |
| 2011/0037439 A1 | 2/2011 | Bhardwaj et al. |
| 2011/0089907 A1 | 4/2011 | Bhardwaj et al. |
| 2011/0190852 A1* | 8/2011 | Dinsmoor ............ A61B 5/0031 607/60 |
| 2011/0254377 A1* | 10/2011 | Wildmer ............... B60L 11/182 307/104 |
| 2011/0285356 A1* | 11/2011 | Maluf .................. H02J 7/0052 320/139 |
| 2011/0316548 A1 | 12/2011 | Ghantous et al. |
| 2012/0025756 A1 | 2/2012 | Xu et al. |
| 2012/0032648 A1 | 2/2012 | Ghantous et al. |
| 2012/0038325 A1 | 2/2012 | Morita et al. |
| 2012/0200266 A1 | 8/2012 | Berkowitz et al. |
| 2012/0203483 A1 | 8/2012 | Ghantous et al. |
| 2012/0235636 A1* | 9/2012 | Partovi .................. H02J 7/025 320/108 |
| 2012/0242285 A1* | 9/2012 | Jung ..................... H02J 7/0029 320/108 |
| 2012/0280650 A1 | 11/2012 | Kim et al. |
| 2012/0310565 A1 | 12/2012 | Redey |
| 2013/0026976 A1 | 1/2013 | Lu |
| 2013/0062966 A1* | 3/2013 | Verghese ................ H02J 7/025 307/104 |
| 2013/0083722 A1 | 4/2013 | Bhargava et al. |
| 2013/0119921 A1 | 5/2013 | Choe et al. |
| 2013/0154548 A1 | 6/2013 | Berkowitz et al. |
| 2013/0193914 A1* | 8/2013 | Gaddam ................ H02J 7/007 320/108 |
| 2014/0021959 A1 | 1/2014 | Maluf et al. |
| 2014/0079969 A1 | 3/2014 | Greening et al. |
| 2014/0084846 A1 | 3/2014 | Berkowitz et al. |
| 2014/0139192 A1 | 5/2014 | Berkowitz et al. |
| 2014/0183970 A1* | 7/2014 | Kurihara ................ H02J 50/80 307/104 |
| 2014/0247004 A1 | 9/2014 | Kari et al. |
| 2014/0266068 A1 | 9/2014 | O'Brien et al. |
| 2014/0312912 A1 | 10/2014 | Berkowitz et al. |
| 2015/0091496 A1 | 4/2015 | Meunier et al. |
| 2015/0153417 A1 | 6/2015 | Maluf et al. |
| 2015/0155734 A1 | 6/2015 | Ghantous et al. |
| 2015/0219722 A1 | 8/2015 | Maluf et al. |
| 2015/0357841 A1 | 12/2015 | Berkowitz et al. |
| 2015/0377976 A1 | 12/2015 | Maluf et al. |
| 2015/0380957 A1 | 12/2015 | Ghantous et al. |
| 2016/0028268 A1 | 1/2016 | Fisher-Jeffes et al. |
| 2016/0106370 A1 | 4/2016 | Filipovic et al. |
| 2017/0346305 A1 | 11/2017 | Berkowitz et al. |
| 2018/0090947 A1 | 3/2018 | Berkowitz et al. |

FOREIGN PATENT DOCUMENTS

| | | |
|---|---|---|
| EP | 1 191 622 A1 | 3/2002 |
| WO | WO 00/013288 | 3/2000 |
| WO | WO 00/075678 | 12/2000 |
| WO | WO 02/021149 | 3/2002 |
| WO | WO 02/021662 | 3/2002 |
| WO | WO 02/041466 | 5/2002 |
| WO | WO 02/093712 | 11/2002 |
| WO | WO 03/107505 | 12/2003 |
| WO | WO 2004/017485 | 2/2004 |
| WO | WO 2004/109311 | 12/2004 |
| WO | WO 2005/003800 | 1/2005 |
| WO | WO 2005/101042 | 10/2005 |
| WO | WO 2005/114808 | 12/2005 |
| WO | WO 2006/057468 | 6/2006 |
| WO | WO 2007/004098 | 1/2007 |
| WO | WO 2008/117239 | 10/2008 |
| WO | WO 2008/128429 | 10/2008 |
| WO | WO 2009/025944 | 2/2009 |
| WO | WO 2009/126734 | 10/2009 |
| WO | WO 2009/126797 | 10/2009 |
| WO | WO 2010/096180 | 8/2010 |
| WO | WO 2011/146783 | 11/2011 |
| WO | WO 2012/135148 | 10/2012 |

OTHER PUBLICATIONS

U.S. Notice of Allowance dated Sep. 12, 2013 issued in U.S. Appl. No. 13/111,902.
U.S. Office Action dated Sep. 30, 2014 issued in U.S. Appl. No. 14/161,755.
U.S. Notice of Allowance dated Nov. 10, 2014 issued in U.S. Appl. No. 14/161,755.
U.S. Notice of Allowance [Corrected Notice of Allowability] dated Jan. 22, 2015 issued in U.S. Appl. No. 14/161,755.
U.S. Office Action dated Dec. 31, 2015 issued in U.S. Appl. No. 14/615,491.
U.S. Notice of Allowance dated Mar. 1, 2016 issued in U.S. Appl. No. 14/615,491.
U.S. Notice of Allowance dated May 31, 2016 issued in U.S. Appl. No. 14/615,491.
U.S. Office Action dated Dec. 31, 2015 issued in U.S. Appl. No. 14/851,921.
U.S. Notice of Allowance dated Mar. 21, 2016 issued in U.S. Appl. No. 14/851,921.
U.S. Notice of Allowance [Supplemental Notice of Allowability] dated Jun. 1, 2016 issued in U.S. Appl. No. 14/851,921.
U.S. Office Action dated Oct. 23, 2013 issued in U.S. Appl. No. 13/167,782.
U.S. Notice of Allowance dated Mar. 27, 2014 issued in U.S. Appl. No. 13/167,782.
U.S. Office Action dated Nov. 28, 2016 issued in U.S. Appl. No. 14/684,371.
U.S. Notice of Allowance dated Jun. 8, 2017 issued in U.S. Appl. No. 14/684,371.
U.S. Notice of Allowance [Supplemental Notice of Allowability] dated Jul. 3, 2017 issued in U.S. Appl. No. 14/684,371.
U.S. Notice of Allowance [Supplemental Notice of Allowability] dated Sep. 21, 2017 issued in U.S. Appl. No. 14/684,371.
U.S. Office Action dated Jun. 26, 2012 issued in U.S. Appl. No. 13/271,340.
U.S. Final Office Action dated Nov. 7, 2012 issued in U.S. Appl. No. 13/271,340.
U.S. Notice of Allowance dated Jan. 25, 2013 issued in U.S. Appl. No. 13/271,340.
U.S. Office Action dated Mar. 28, 2012 issued in U.S. Appl. No. 13/271,910.
U.S. Notice of Allowance dated Oct. 5, 2012 issued in U.S. Appl. No. 13/271,910.
U.S. Office Action dated Apr. 24, 2013 issued in U.S. Appl. No. 13/767,839.
U.S. Notice of Allowance dated May 14, 2013 issued in U.S. Appl. No. 13/767,839.
U.S. Notice of Allowance dated Jan. 9, 2015 issued in U.S. Appl. No. 14/322,863.
U.S. Notice of Allowance dated Oct. 23, 2014 issued in U.S. Appl. No. 13/366,352.
U.S. Office Action dated May 17, 2016 issued in U.S. Appl. No. 14/615,486.
U.S. Office Action dated Sep. 28, 2016 issued in U.S. Appl. No. 14/615,486.
U.S. Notice of Allowance dated Feb. 21, 2017 issued in U.S. Appl. No. 14/615,486.
U.S. Notice of Allowance [Supplemental Notice of Allowability] dated Apr. 18, 2017 issued in U.S. Appl. No. 14/615,486.
U.S. Notice of Allowance [Supplemental Notice of Allowability] dated Jun. 12, 2017 issued in U.S. Appl. No. 14/615,486.
U.S. Notice of Allowance dated Mar. 27, 2015 issued in U.S. Appl. No. 14/003,826.

(56) References Cited

OTHER PUBLICATIONS

U.S. Office Action dated Aug. 17, 2017 issued in U.S. Appl. No. 14/752,592.
U.S. Final Office Action dated Jan. 8, 2018 issued in U.S. Appl. No. 14/752,592.
U.S. Office Action dated Dec. 9, 2014 issued in U.S. Appl. No. 13/626,605.
U.S. Notice of Allowance dated May 20, 2015 issued in U.S. Appl. No. 13/626,605.
U.S. Office Action dated Feb. 1, 2017 issued in U.S. Appl. No. 14/828,235.
U.S. Notice of Allowance dated May 17, 2017 issued in U.S. Appl. No. 14/828,235.
U.S. Notice of Allowance dated Mar. 3, 2015 issued in U.S. Appl. No. 13/657,841.
U.S. Notice of Allowance dated Apr. 4, 2017 issued in U.S. Appl. No. 14/712,068.
U.S. Office Action dated Jun. 19, 2013 issued in U.S. Appl. No. 13/747,914.
U.S. Final Office Action dated Nov. 8, 2013 issued in U.S. Appl. No. 13/747,914.
U.S. Notice of Allowance dated Jan. 21, 2015 issued in U.S. Appl. No. 13/747,914.
U.S. Office Action dated Jul. 3, 2014 issued in U.S. Appl. No. 14/252,422.
U.S. Final Office Action dated Dec. 30, 2014 issued in U.S. Appl. No. 14/252,422.
U.S. Office Action dated Aug. 27, 2015 issued in U.S. Appl. No. 14/252,422.
U.S. Notice of Allowance dated Jun. 24, 2016 issued in U.S. Appl. No. 14/252,422.
U.S. Notice of Allowance (Corrected Notice of Allowability) dated Aug. 29, 2016 issued in U.S. Appl. No. 14/252,422.
PCT International Search Report and Written Opinion, dated Jul. 26, 2011, issued in PCT/US2011/037255.
PCT International Preliminary Report on Patentability, dated Dec. 6, 2012, issued in PCT/US2011/037255.
Chinese First Office Action, dated Aug. 1, 2014, issued in CN 201180025100.4.
Chinese Second Office Action, dated Apr. 16, 2015, issued in CN 201180025100.4.
Korean Office Action dated Mar. 22, 2017 issued in KR 10-2012-7033330.
PCT International Search Report and Written Opinion, dated Jul. 13, 2012, issued in PCT/US2012/030618.
PCT International Preliminary Report on Patentability and Written Opinion, dated Oct. 10, 2013, issued in PCT/US2012/030618.
Chinese First Office Action, dated Oct. 17, 2016, issued in CN 201310450976.4.
Chinese Notice of Allowance and Search Report, dated Jun. 19, 2017, issued in CN 201310450976.4.
Purushothaman et al., (2005) Reduced Mass Transport Limitations by Application of Special Pulse Current modes, J. of Electrochemical Soc., 152(4):J33-J39.
Purushothaman et al., (2006) "Rapid Charging of Lithium-Ion Batteries using Pulsed Currents," J. of Electrochemical Soc., 153(3):A533-A542.
Ning et al.(2004) Cycle Life Modeling of Lithium-ion Batteries, J. of Electrochemical Soc., 151(10):A1584-A1591.
Ning et al. (2006) "A Generalized Cycle Life Model of Rechargeable Lithium-Ion Batteries," Electrochimica Acta, 51:2012-2022.
Persson et al. (2010) "Lithium Diffusion in Graphitic Carbon," J. Phys. Chem. Letters, 1:1176-1180.
Piao et al. (1999) "Intercalation of Lithium Ions into Graphite Electrodes Studied by AC Impedance Measurements," J. of Electrochemical Soc., 146(8):2794-2798.
Santhanagopalan et al., (2006) "Online estimation of the state of charge of a lithium ion cell," Journal of Power Sources, Elsevier, B.V. 161:1346-1355.
U.S. Appl. No. 14/712,068, filed May 14, 2015, Ghantous et al.
U.S. Appl. No. 15/234,995, filed Aug. 11, 2016, Berkowitz et al.
U.S. Appl. No. 15/730,670, filed Oct. 11, 2017, Berkowitz et al.
Notice of Allowance dated Apr. 30, 2018 issued in U.S. Appl. No. 14/752,592.
U.S. Office Action dated Apr. 25, 2018 issued in U.S. Appl. No. 15/681,071.
U.S. Notice of Allowance dated Sep. 27, 2018 issued in U.S. Appl. No. 15/681,071.
U.S. Office Action dated May 16, 2018 issued in U.S. Appl. No. 15/730,670.
U.S. Appl. No. 16/107,560, filed Aug. 21, 2018, Maluf et al.
U.S. Office Action dated May 17, 2018 issued in U.S. Appl. No. 15/234,995.
U.S. Notice of Allowance dated May 23, 2019 issued in U.S. Appl. No. 15/730,670.
U.S. Notice of Allowance dated Jun. 14, 2019 issued in U.S. Appl. No. 15/234,995.
U.S. Appl. No. 16/459,824, filed Jul. 2, 2019, Berkowitz et al.

\* cited by examiner

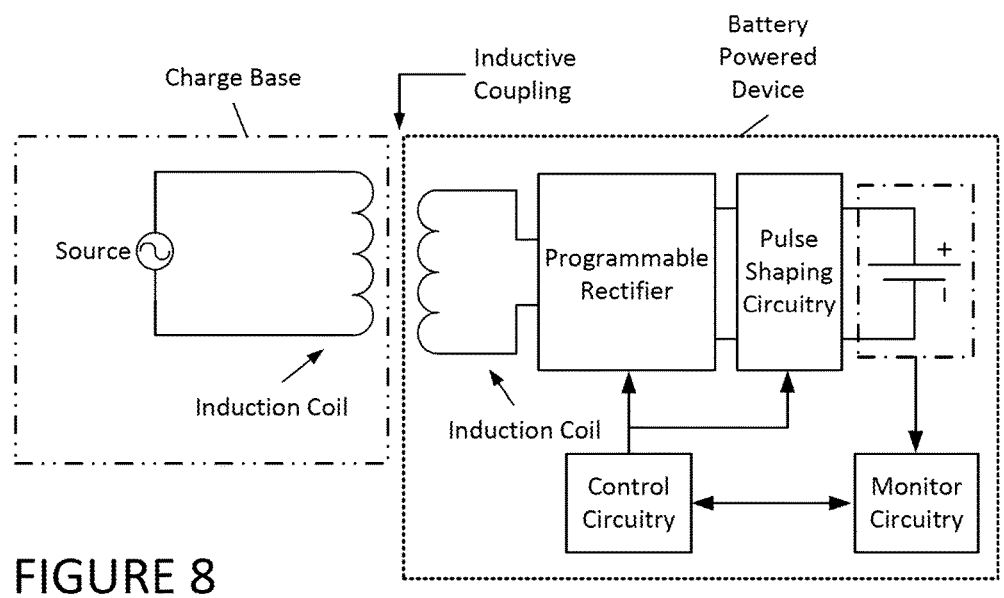
FIGURE 8
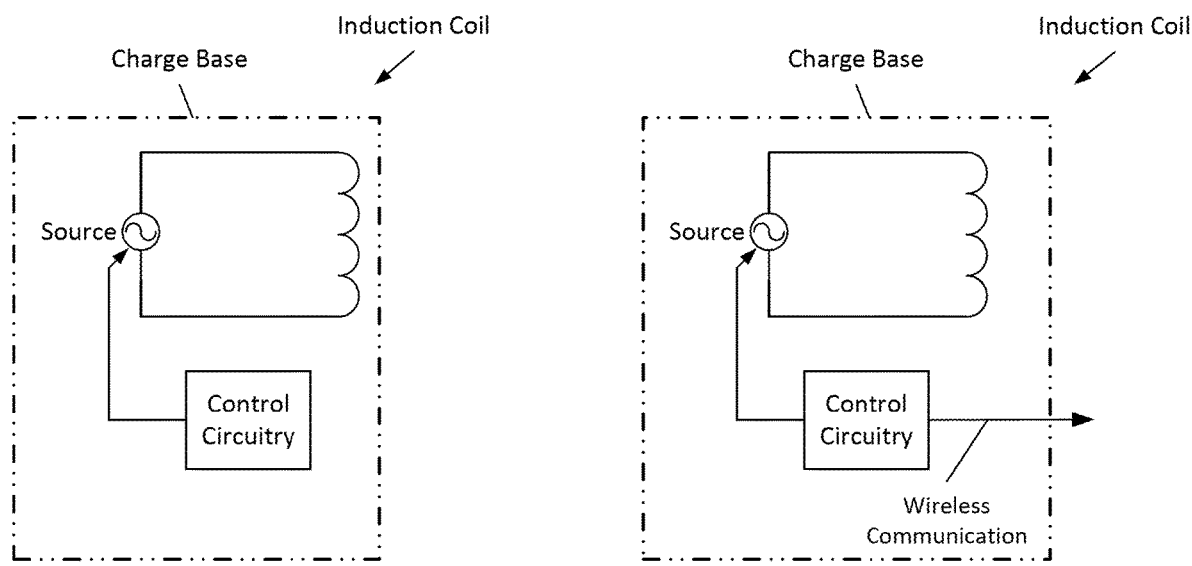
FIGURE 9A
FIGURE 9B

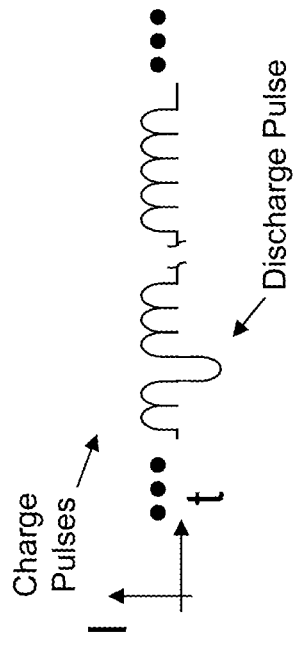
FIGURE 11A
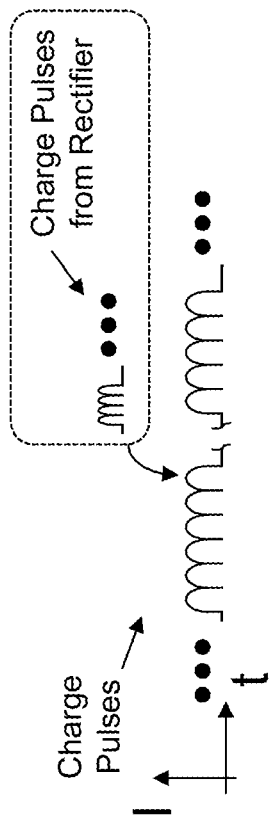
FIGURE 11B
FIGURE 11C
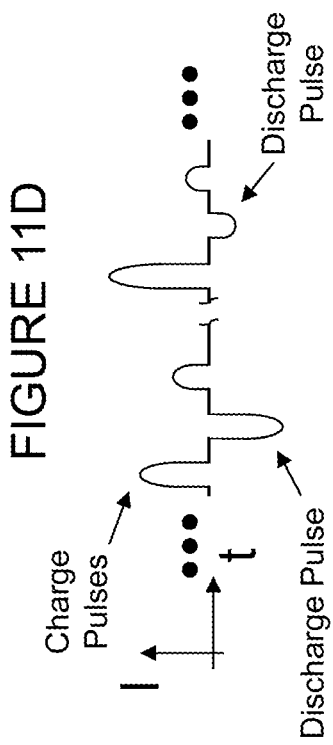
FIGURE 11D
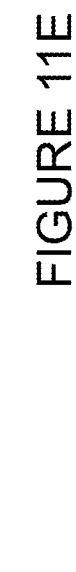
FIGURE 11E
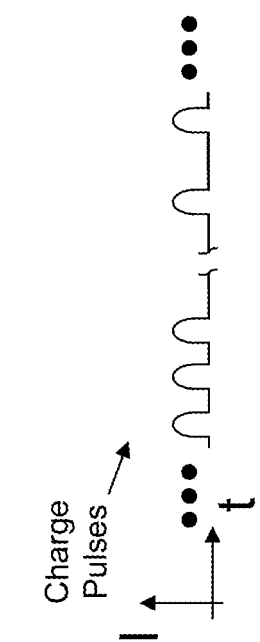
FIGURE 11F

FIGURE 12A
FIGURE 12B
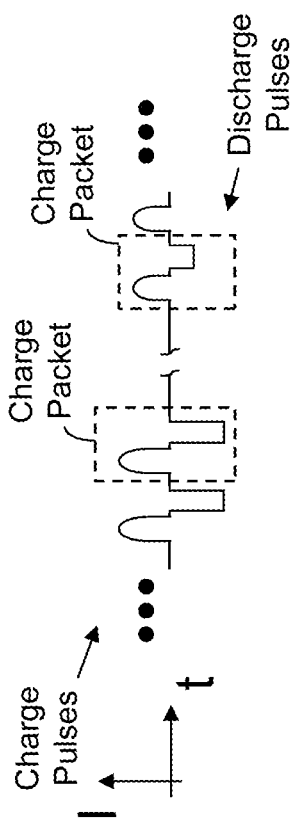
FIGURE 12C
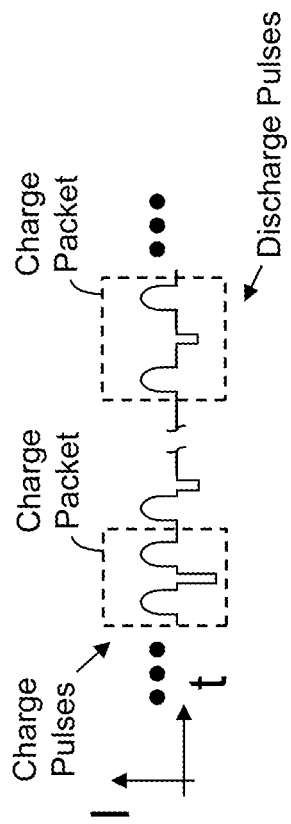
FIGURE 12D
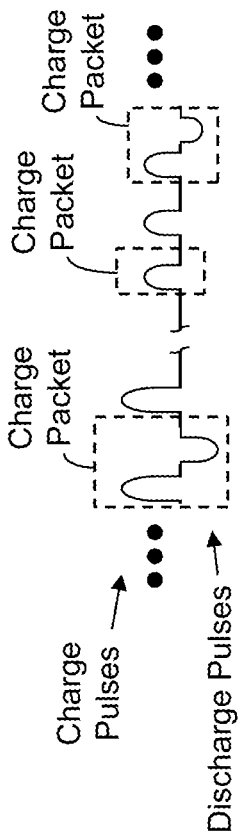
FIGURE 12E

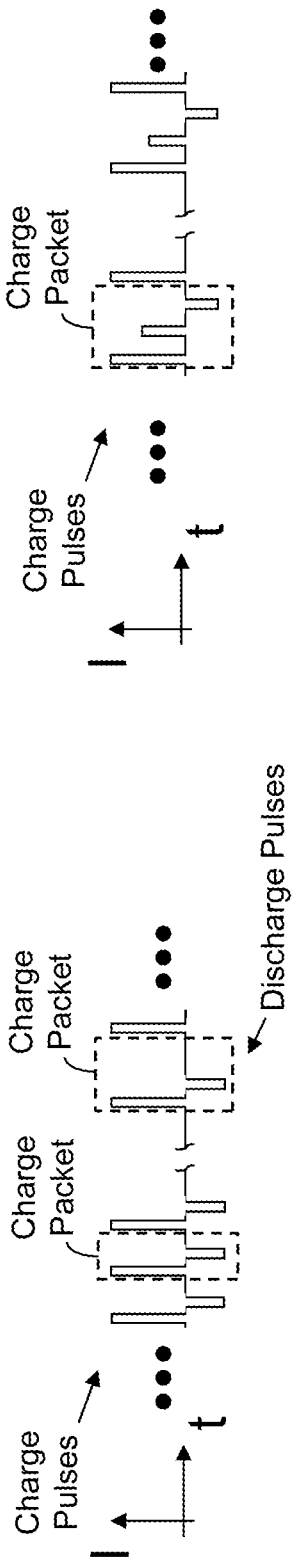
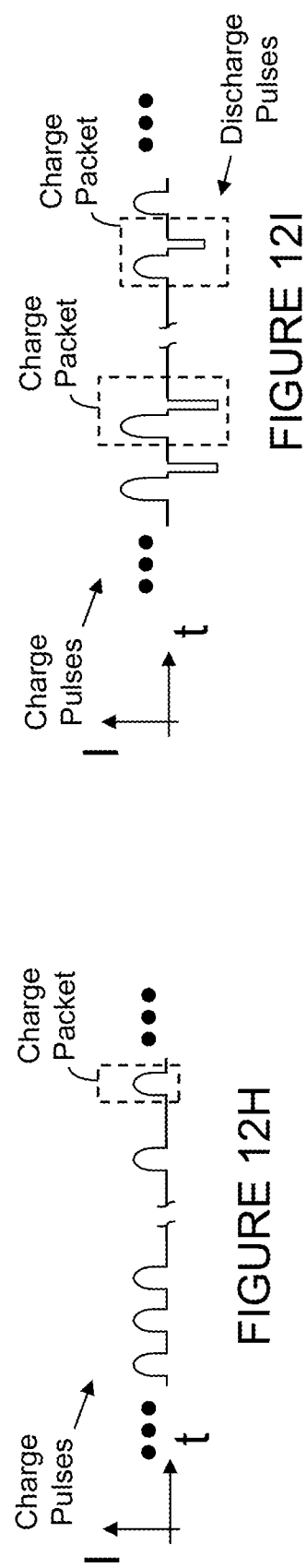
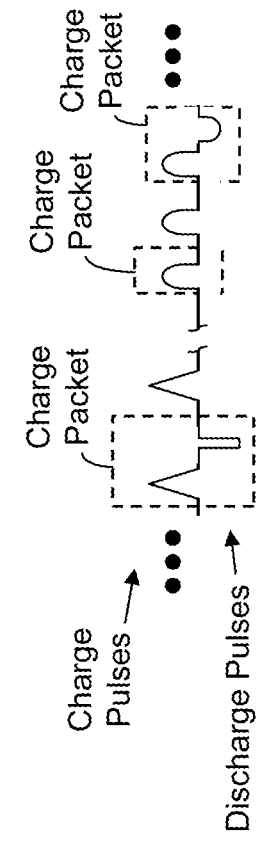
FIGURE 12F
FIGURE 12G
FIGURE 12H
FIGURE 12I
FIGURE 12J

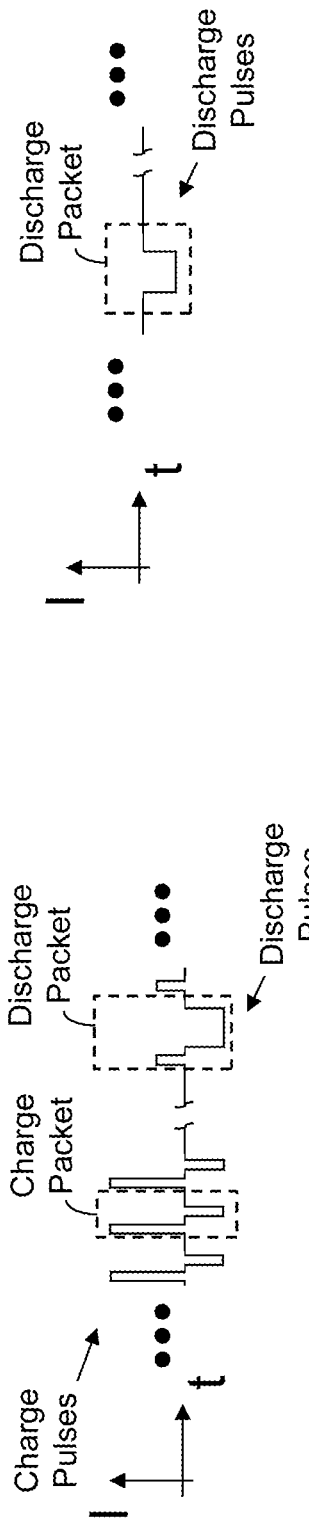
FIGURE 12K
FIGURE 12L
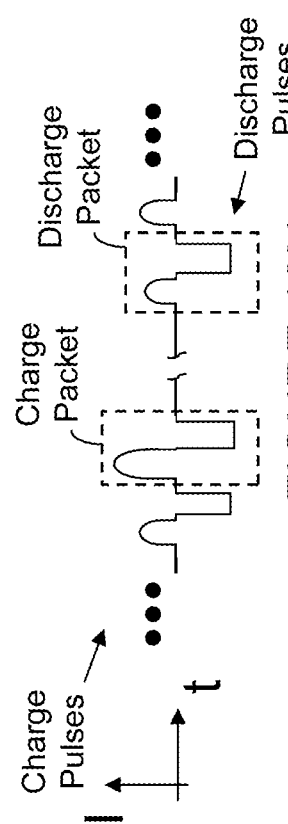
FIGURE 12M
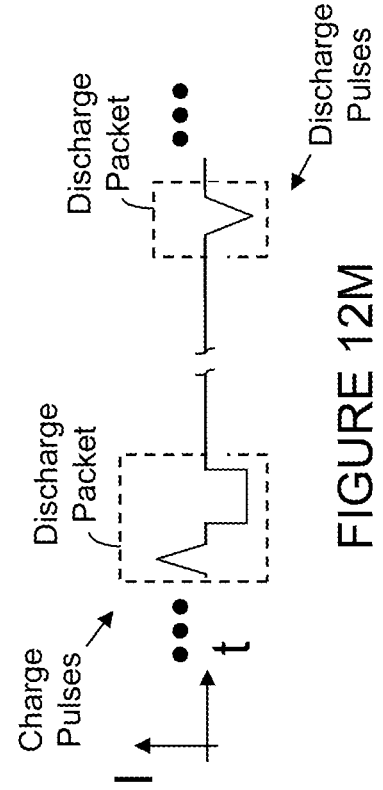
FIGURE 12N

WIRELESS CHARGING TECHNIQUES AND CIRCUITRY FOR A BATTERY

CROSS REFERENCE TO RELATED PATENT APPLICATION

This application claims the benefit of U.S. Provisional Application Ser. No. 62/015,072, filed Jun. 20, 2014, by Berkowitz et al., and titled "WIRELESS CHARGING TECHNIQUES AND CIRCUITRY FOR A BATTERY", which is herein incorporated by reference in its entirety and for all purposes.

BACKGROUND

This disclosure pertains to apparatus and methods for charging batteries. Conventional approaches to charging batteries are limited in many ways. One limitation is that batteries are typically charged using an apparatus that physically connects a discharged or partially discharged battery to a power source.

SUMMARY

In one aspect, the present inventions relate to circuitry for and methods of charging or re-charging (hereinafter collectively "charging") a battery/cell using wireless charging circuitry. The wireless charging circuitry and system may be based on inductive coupling wherein the output of the charging circuitry is an unregulated current and/or voltage which is applied to the battery/cell (hereinafter collectively "battery" or "battery/cell"). For example, in one embodiment, the wireless charging circuitry includes a full-wave or half-wave rectifier circuitry to generate corresponding current and/or voltage pulses (for example, pulse based on or corresponding to the full-wave or half-wave rectified signal from the rectifier circuitry). The rectified current and/or voltage pulses, without subsequent regulation via a DC switching regulator, may be employed as the charging signal that is applied to the battery. That is, in this embodiment, the charging circuitry does not include a current and/or voltage DC switching regulator, electrically coupled between the full-wave or half-wave rectifier circuitry and the output of the charging circuitry, to generate a regulated current and/or voltage charging signal; rather, the wireless charging circuitry generates a plurality of charge pulses using the rectifier circuitry wherein the charge pulses (applied to the battery) correspond to the full-wave or half-wave rectified current and/or voltage therefrom.

In another aspect, the present inventions relate to circuitry for and methods of adaptively charging or charging a battery/cell using wireless charging circuitry. In this aspect, the present inventions, wireless charging circuitry may be based on inductive coupling wherein the output of the charging circuitry is an adapted, unregulated current and/or voltage. In one embodiment, the adaptation of the unregulated current and/or voltage may be based on the charging and/or operating conditions of the battery. For example, the wireless charging circuitry, which is responsive to control signals from control circuitry, generates a plurality of pulses via the full-wave or half-wave rectifier circuitry. The characteristics of (i) the full-wave or half-wave rectified current and/or voltage (for example, pulse amplitude, pulse duration, period/frequency, the existence and/or duration of rest periods between pulses and/or whether the output is full-wave or half-wave rectified current and/or voltage pulses) and/or (ii) the current and/or voltage pulses applied to the battery/cell (for example, a maximum current applied to the battery/cell during charging operations ($I_{max}$) and/or a maximum terminal voltage during charging operations ($V_{max}$)) may be adapted in accordance with, for example, an over-potential (OP) or full relaxation time (FRT) of the battery/cell, a charge pulse voltage (CPV) or a change in CPV, a partial relaxation time (PRT) of the battery/cell, a temperature of the battery/cell ($T°_{b/c}$), and/or a swelling of the battery. The control circuitry which implements the adaptation may be disposed in the charge base and/or in the battery powered device.

In addition thereto, or in lieu thereof, the adaptation of the unregulated current and/or voltage may be based on the operating conditions of the charging circuitry (for example, operating temperature and/or operating efficiency) of one or more (or all) of the charging circuits of the wireless charging circuitry ($T°_{cc}$) and/or an operating temperature of the housing ($T°_{h}$). Here, control circuitry disposed in the charge base and/or in the battery powered device may control the charging process or sequence, for example, adapt the characteristics of (i) the full-wave or half-wave rectified current and/or voltage and/or (ii) the current and/or voltage pulses applied to the battery/cell in accordance with operating conditions of the charging circuitry and/or an operating temperature of the housing (which may be in lieu of or in addition to the adaptation in accordance with the charging and/or operating conditions of the battery/cell).

In one embodiment, the control circuitry is disposed on/in the charge base of an inductive charging system. In another embodiment, the control circuitry is disposed on/in the battery powered device. In yet another embodiment, control circuitry is disposed on/in the charge base of an inductive charging system and on/in the battery powered device. The control circuitry on one side of the system may communicate with circuitry or elements on the other side of the system via wireless communication. Such wireless communications (for example, RF or optical communication techniques) may be implemented via the induction coils and/or a transmission link separate from the induction coils. Notably, where available, suitable, desirable, advantageous, practicable and/or feasible, the control circuitry may also communicate via wired communication. Indeed, notably, any technique, protocols and/or circuitry now known or later developed, including wireless and wired techniques, are intended to fall within the scope of the present inventions.

The control circuitry may control any aspect of the system to implement the charging sequence or operation (whether adaptively or not). For example, in one embodiment, the control circuitry controls the source coil employed to generate an alternating electromagnetic field from within a charge base. In another embodiment, the control circuitry may control the induction coil in the battery powered device (for example, via selection of or enable a tap output of/on the induction coil) which employs the power from the electromagnetic field and converts it back into electrical current. The induction coils in the charge base and battery powered device, when in proximity, combine to form an electrical transformer. Notably, the greater distances between sender and receiver coils can be achieved when the inductive charging system uses resonant inductive coupling.

The wireless charging circuitry and system may include monitor circuitry which provides data which is representative of the charging conditions of, for example, the battery/cell (for example, temperature, current and/or voltage data), and/or the charging circuitry and/or the housing, during the charging process. The monitor circuitry may include one or more voltage and/or current sensors (for example, voltmeter and/or current meter) to determine, measure and/or monitor a voltage at the terminals of the battery/cell and/or a current through the battery/cell during the charging sequence or operation. The control circuitry may employ data from the monitor circuitry to implement one or more adaptive charging techniques.

The wireless charging circuitry and system may include a fixed or programmable rectifier. Where the rectifier is programmable, the control circuitry may control or configure the programmable rectifier. For example, the control circuitry may control one or more characteristics of the full-wave or half-wave rectified current and/or voltage output pulses output by rectifier circuitry (for example, pulse amplitude, pulse duration, period/frequency, the existence and/or duration of rest periods between pulses and/or whether the output is full-wave or half-wave rectified current and/or voltage pulses). Again, the control circuitry may be disposed on/in the charge base and/or the battery powered device wherein communication with the rectifier may be via wireless or wired techniques.

In yet another embodiment, the wireless charging circuitry and system may include pulse shaping circuitry electrically coupled between the rectifier and the battery. In one embodiment, the pulse shaping circuitry provides control or modification of the characteristics of the output pulses of the full-wave or half-wave rectified current and/or voltage pulses applied to the battery/cell during a charging operation; such a configuration/embodiment may facilitate implementation of adaptive control of the charging process. In addition thereto, or in lieu thereof, the pulse shaping circuitry may provide battery protection during charging, for example, manage/control the amplitude of the pulses from exceeding a predetermined level.

The pulse shaping circuitry may be fixed or programmable. Where the pulse shaping circuitry is programmable, control circuitry may configure one or more characteristics of the operation of the circuitry and thereby control the characteristics of the full-wave or half-wave rectified current and/or voltage pulses that are output by rectifier circuitry (for example, the amplitude of the rectified current and/or voltage output pulses). The control circuitry may implement adaptive charging techniques via the programmable pulse shaping circuitry. The pulse shaping circuitry may include a limiter circuit such as a circuit that clips or limits the amplitude of one or more of the rectified pulses.

Notably, the techniques and circuitry of the present inventions may employ one or more (or all) of the charging processes and circuitry described and/or illustrated in the U.S. patent application Ser. Nos. 13/111,902, 13/167,782, 13/366,352, 13/626,605, 13/657,841, 13/747,914, 13/836,235, 14/003,826, 14/075,667 and/or 14/252,422—all of which are hereby incorporated by reference in their entireties. Notably, the present inventions may implement any adaptive charging techniques now known or later developed (including those described and/or illustrated in the aforementioned applications).

BRIEF DESCRIPTION OF THE DRAWINGS

In the course of the detailed description to follow, reference will be made to the attached drawings. These drawings show different aspects of the present inventions and, where appropriate, reference numerals illustrating like structures, components, materials and/or elements in different figures are labeled similarly. It is understood that various combinations of the structures, components, and/or elements, other than those specifically shown, are contemplated and are within the scope of the present inventions.

Moreover, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein.

Notably, reference herein to "one embodiment" or "an embodiment" means that a particular feature, structure, or characteristic described in connection with the embodiment can be included in one some or all of the embodiments of the present inventions. The appearances of the phrase "in one embodiment" in various places in the specification are not referring to the same embodiment, nor are separate or alternative embodiments necessarily mutually exclusive of other embodiments. The same applies to the term "implementation." Moreover, an embodiment or implementation described herein as "exemplary" is not to be construed as preferred or advantageous, for example, over other embodiments or implementations; rather, it is intended reflect or indicate the embodiment(s) is/are "example" embodiment(s).

Figure 1A:
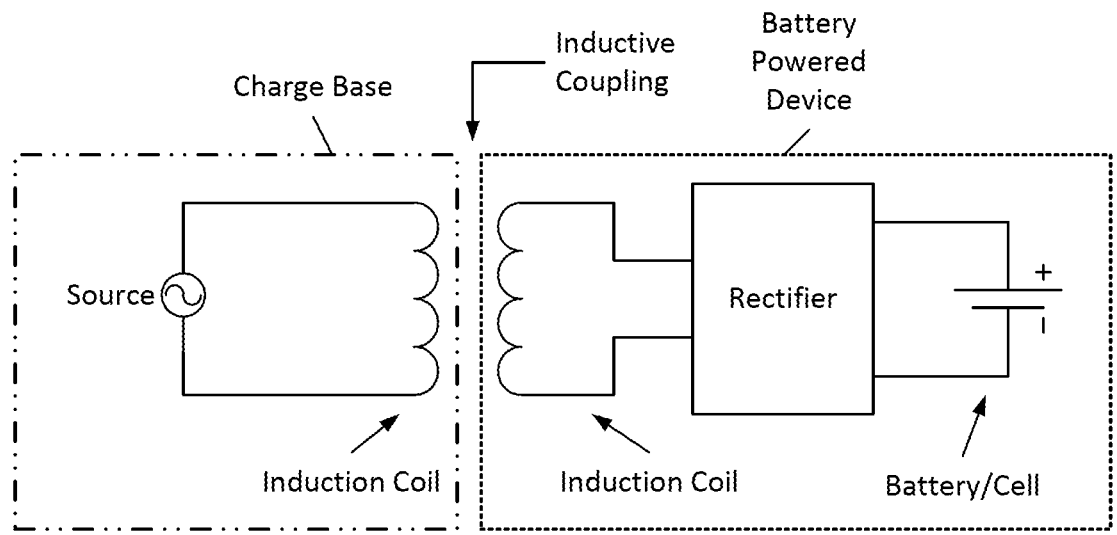
Figure 1B:
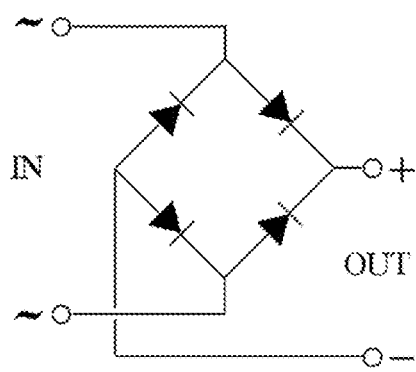
Figure 2A:
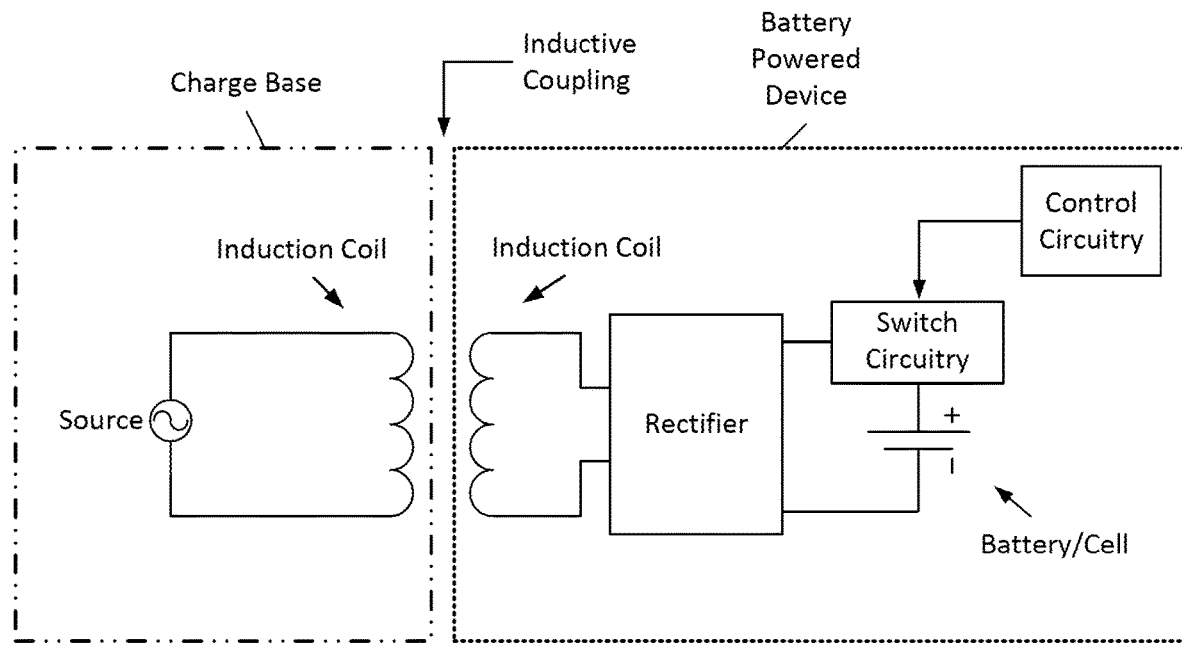
Figure 2B:
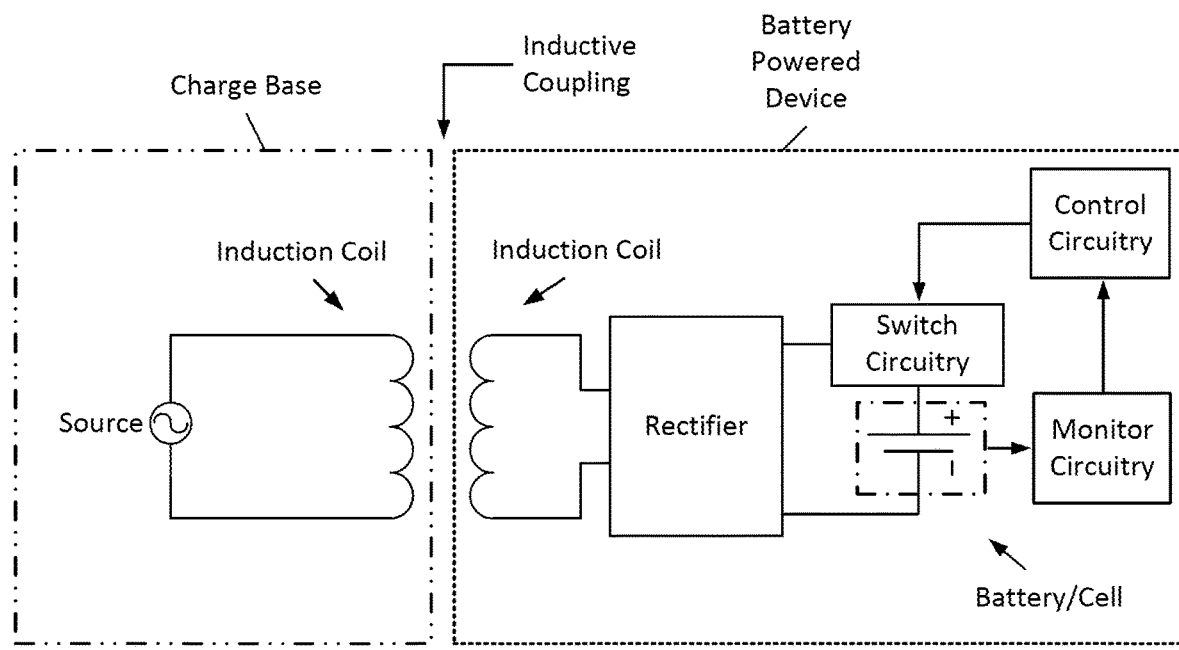
Figure 3:
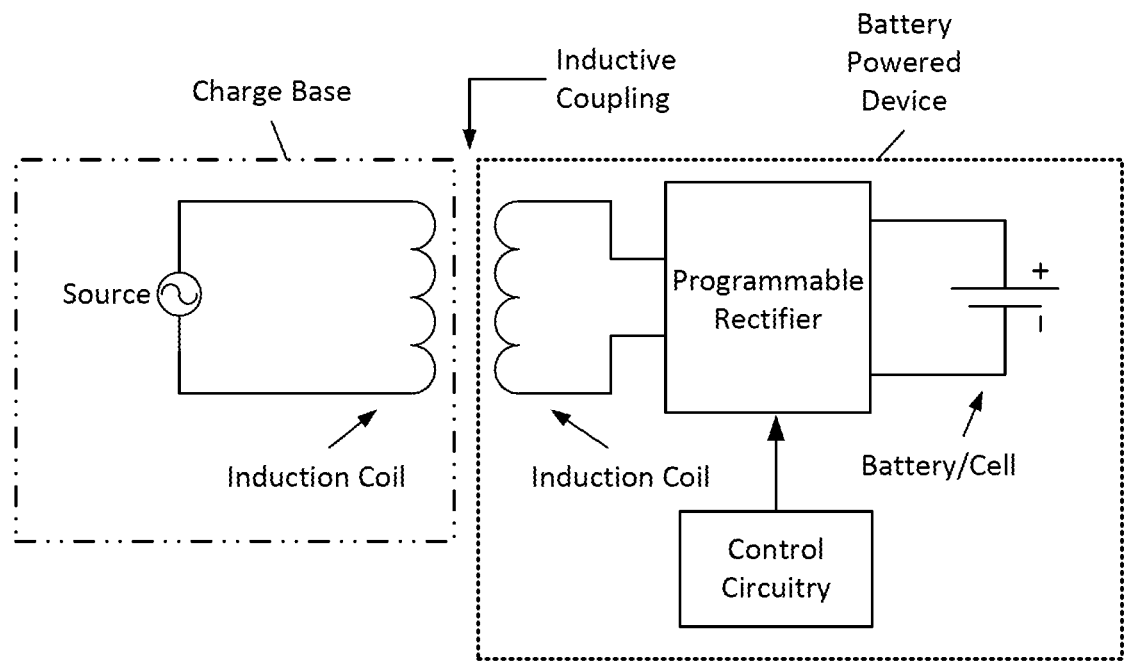
Figure 4:
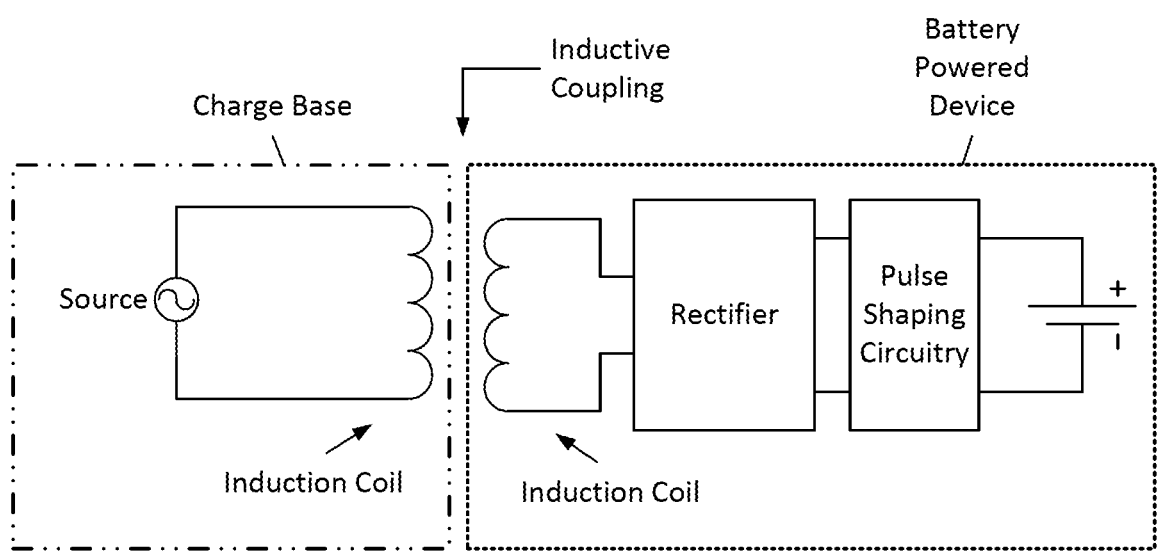
Figure 5A:
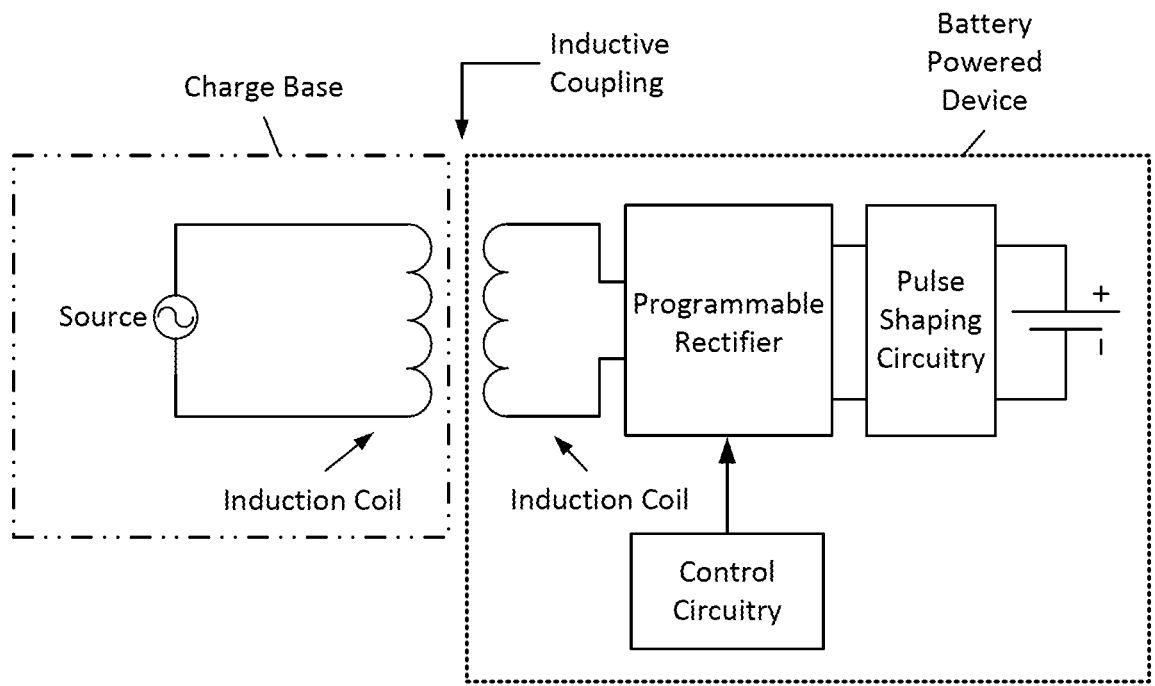
Figure 5B:
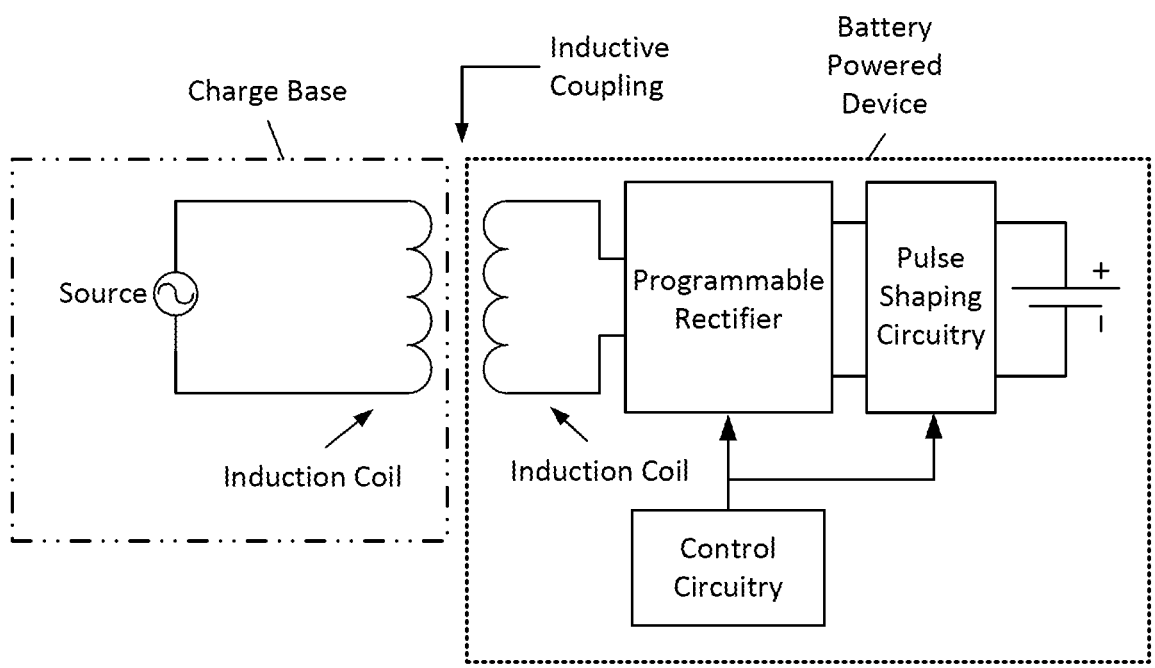
Figure 5C:
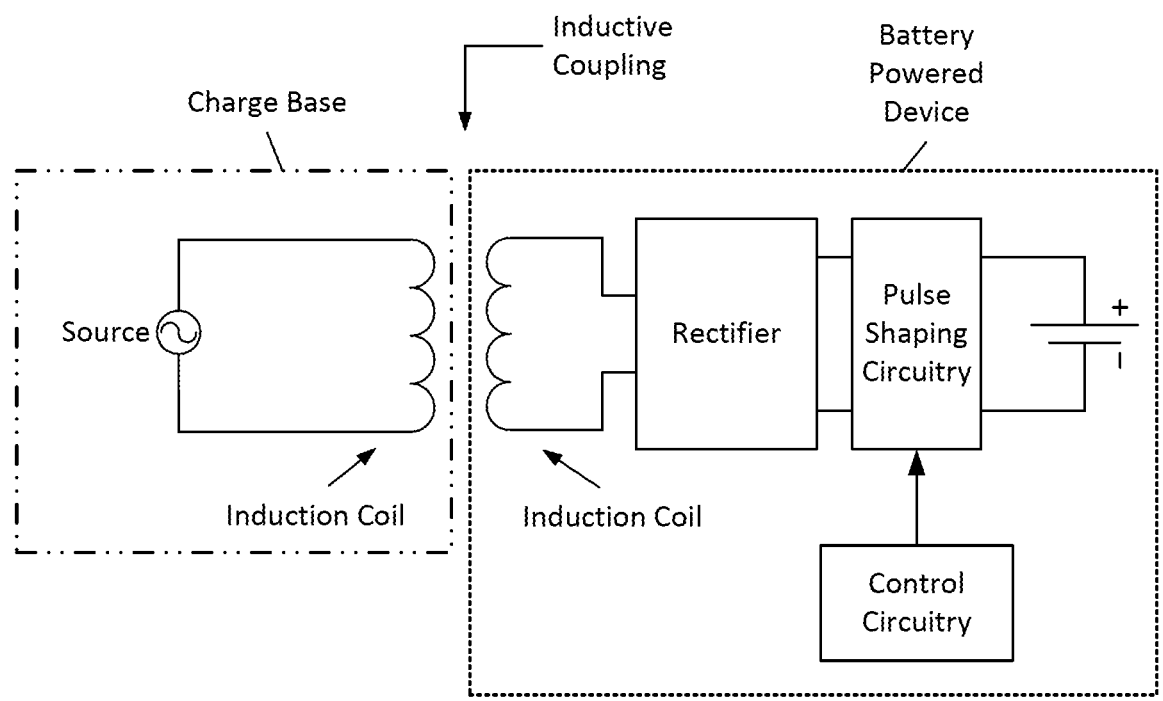
Figure 6:
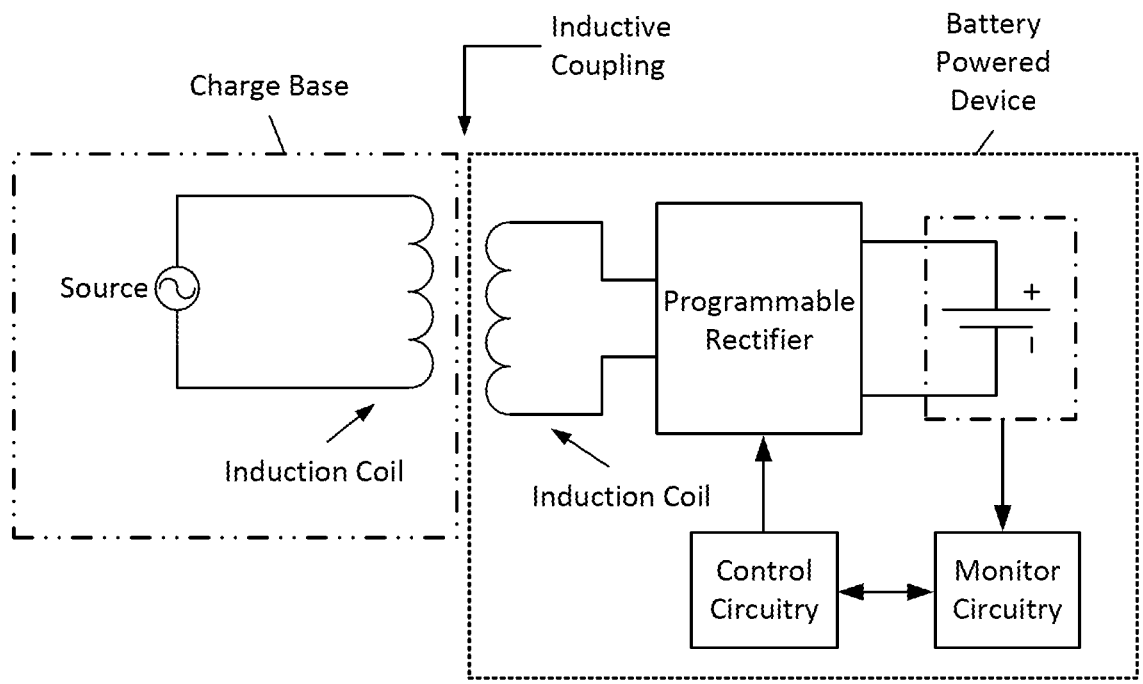
Figure 7:
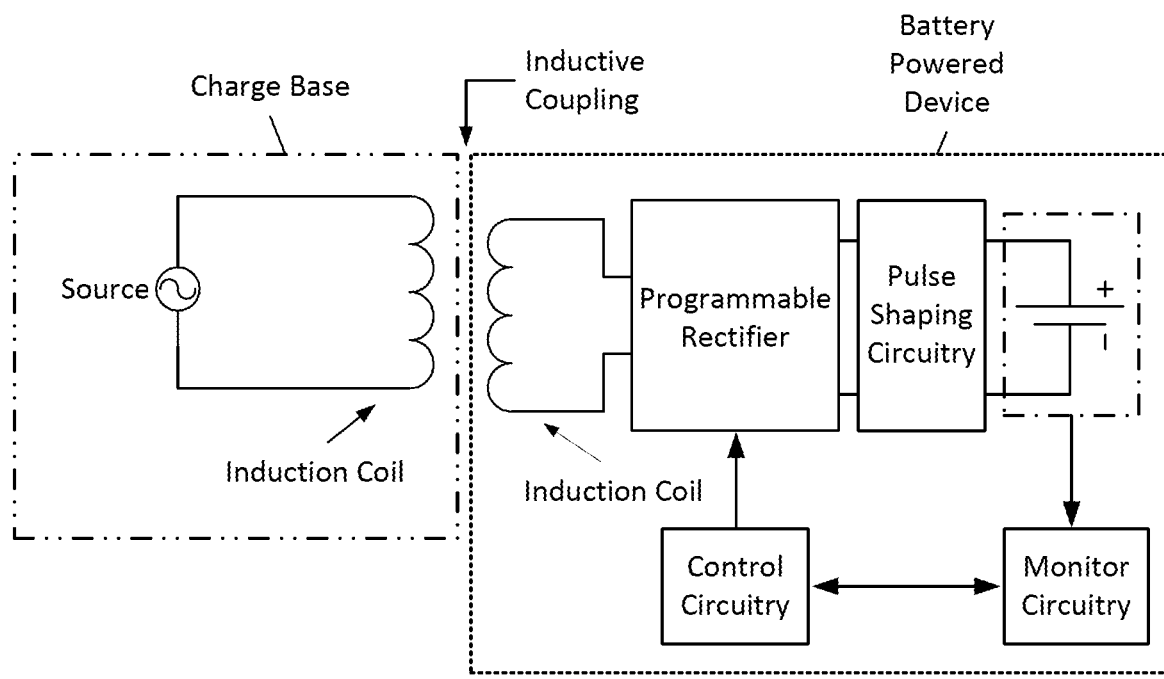
Figure 9C:
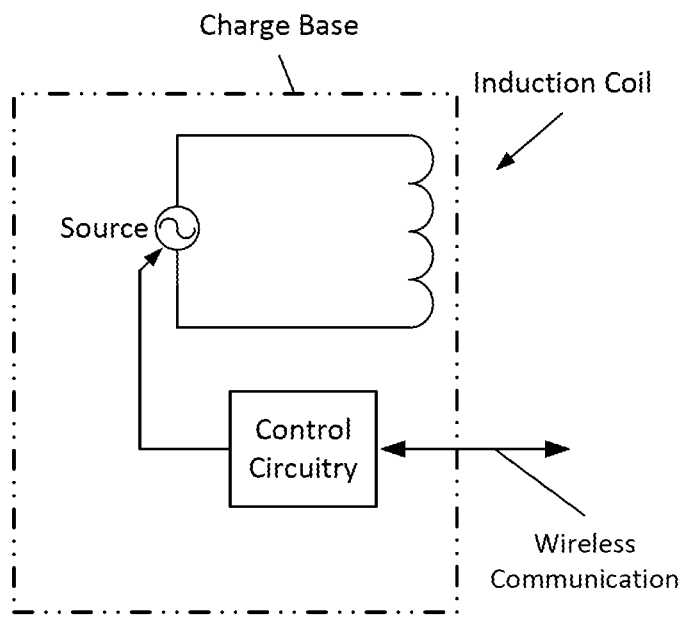
Figure 9D:
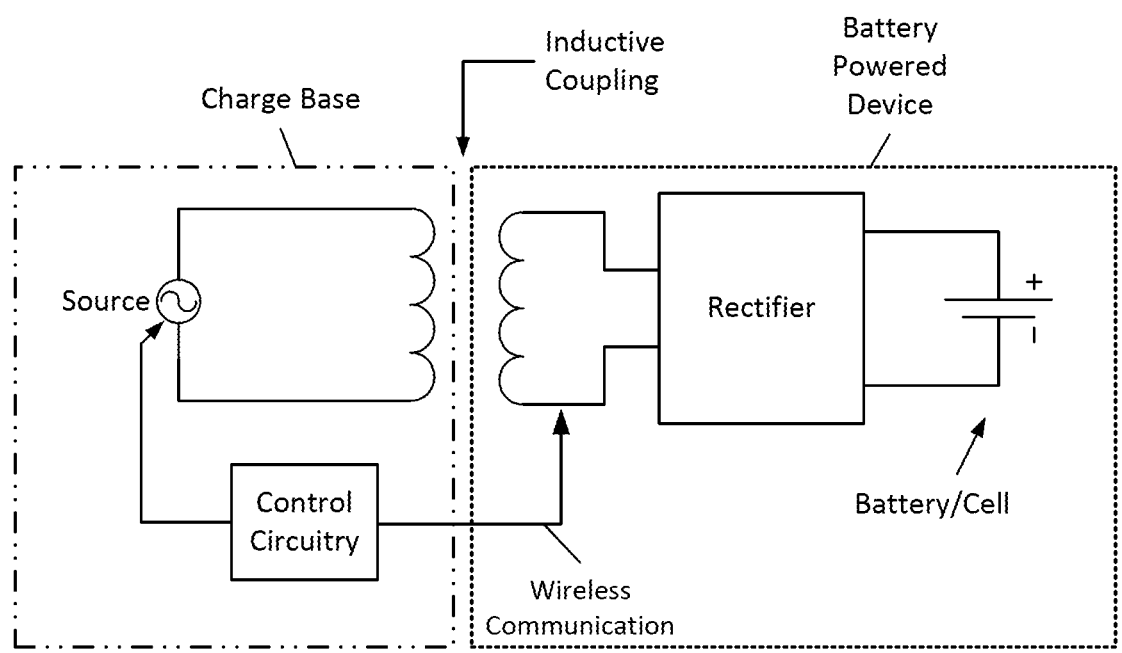
Figure 9E:
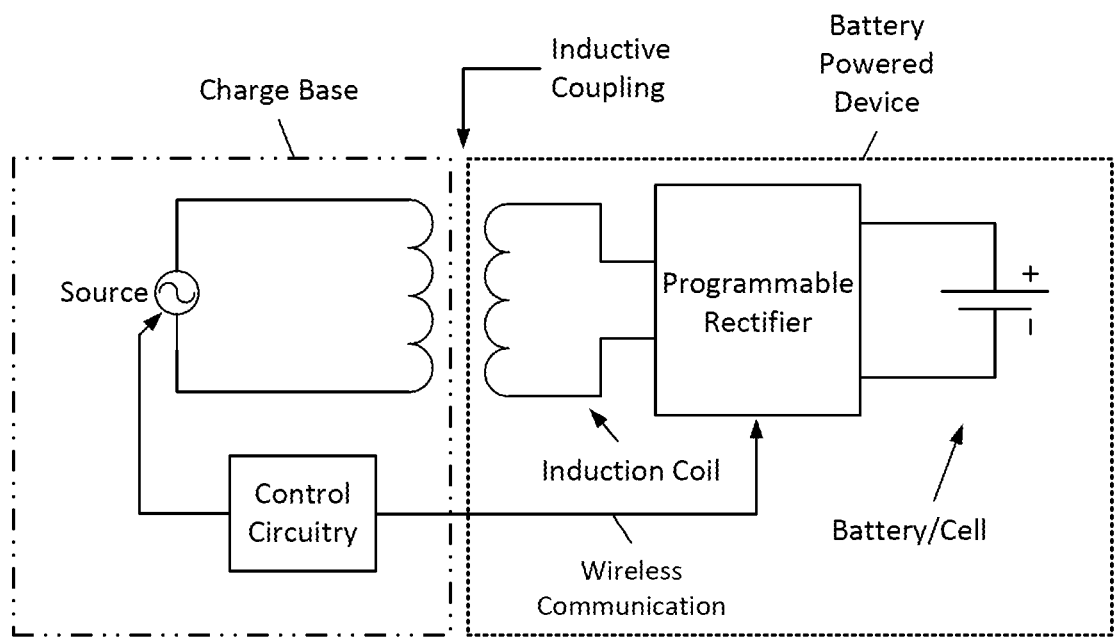
Figure 9F:
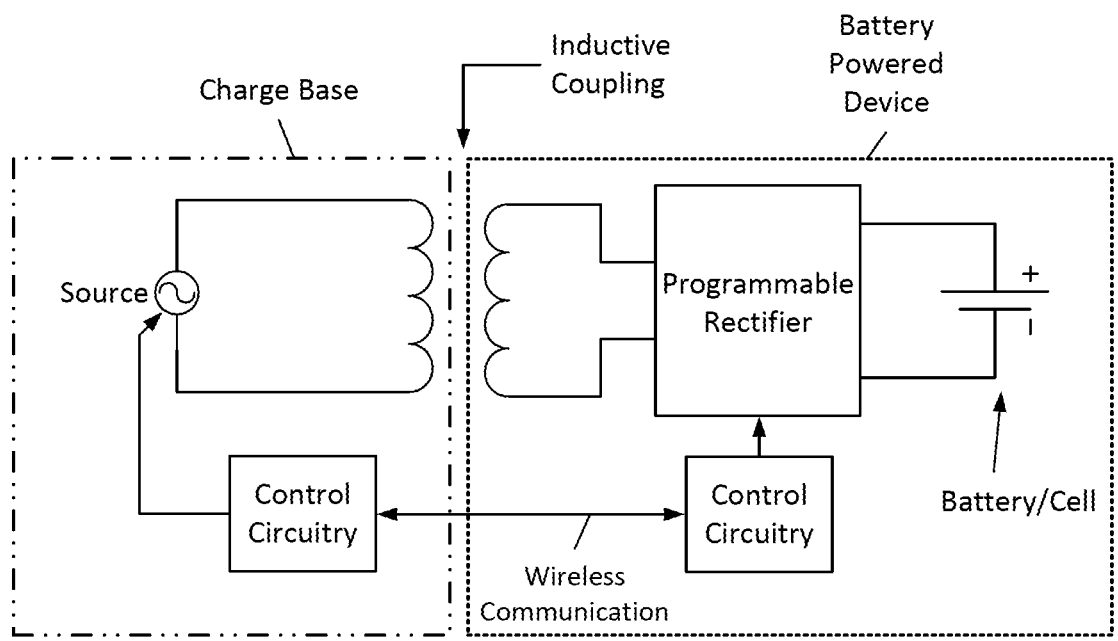
Figure 9G:
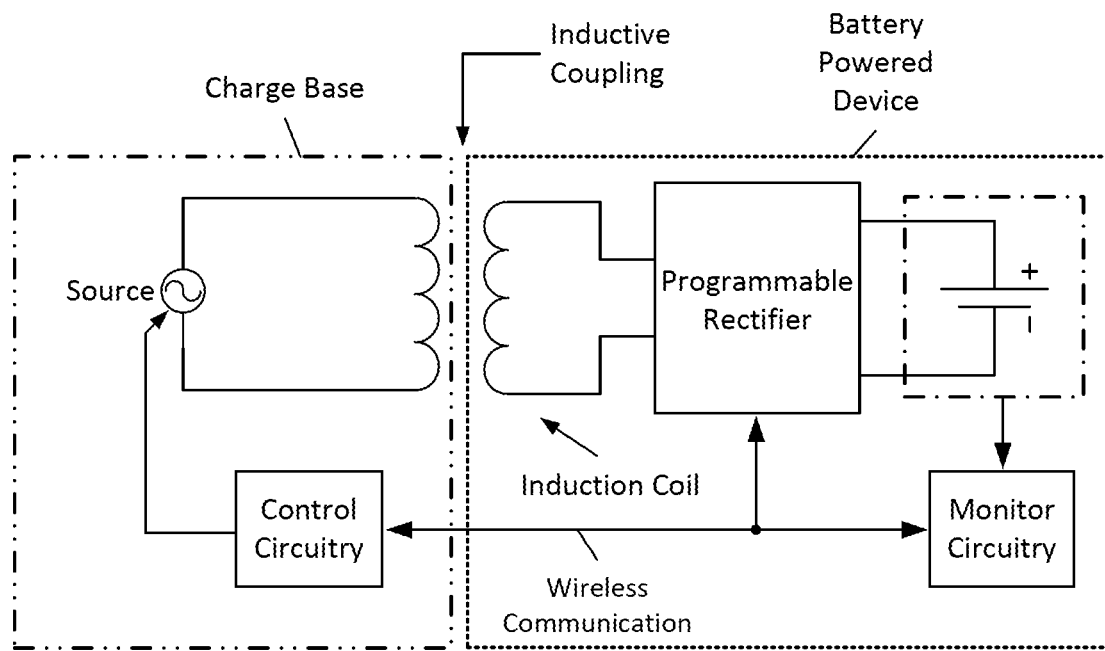
Figure 9H:
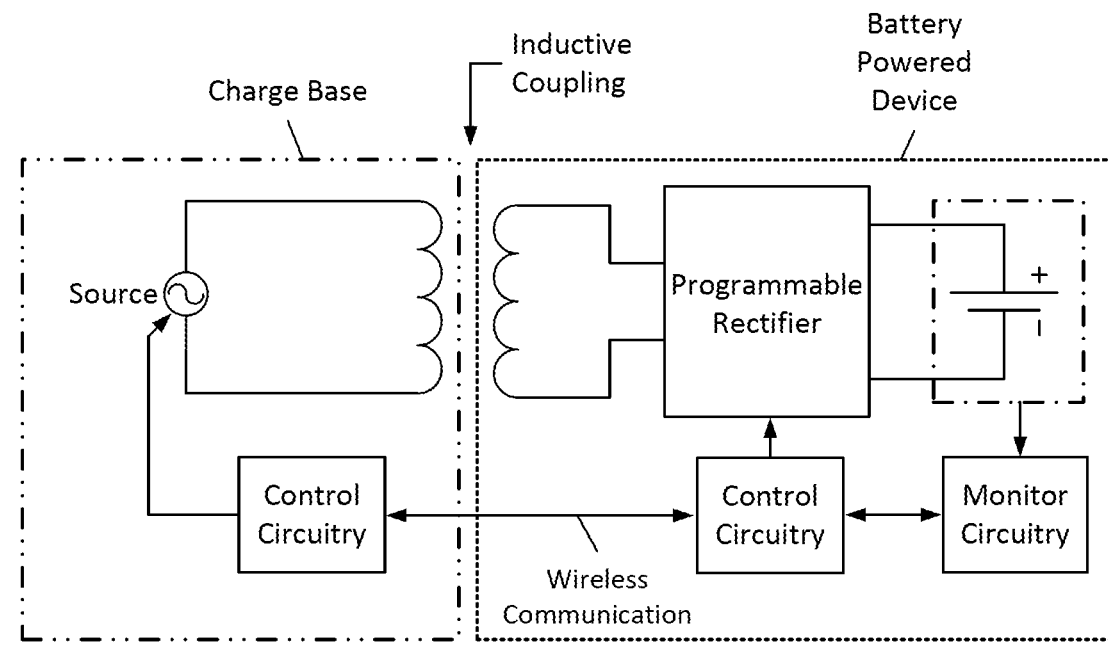
Figure 9I:
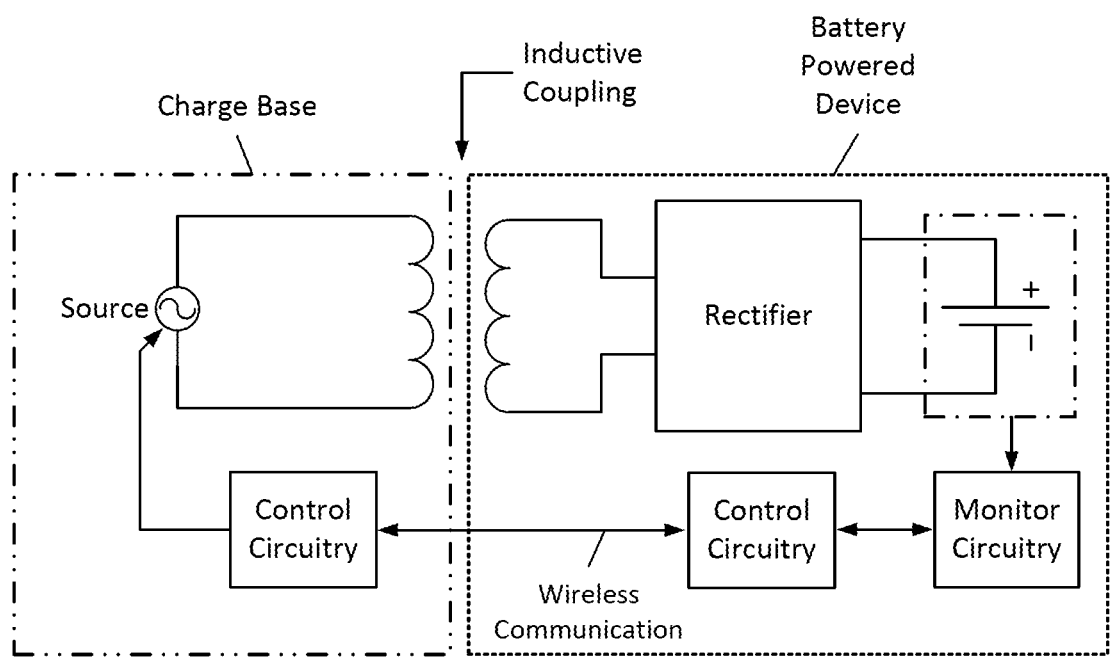
Figure 9J:
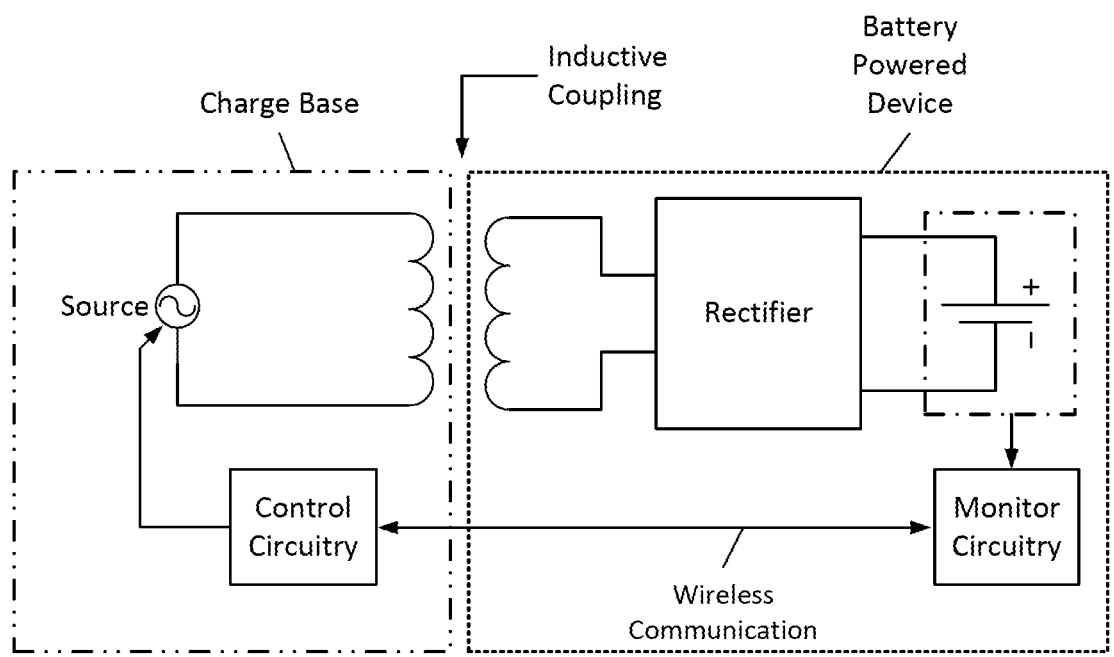
Figure 13:
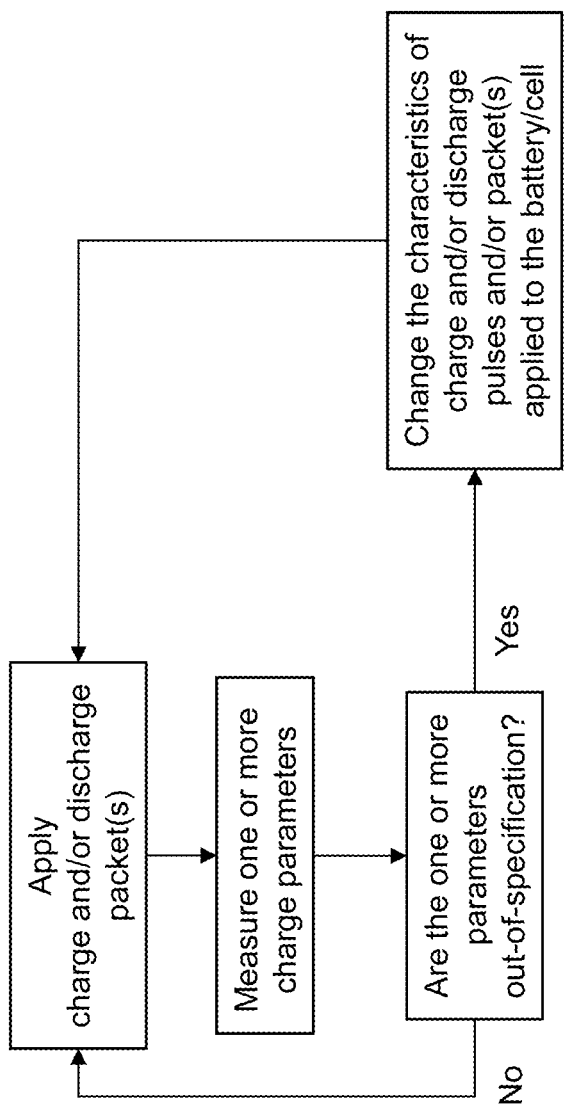
Figure 14B:
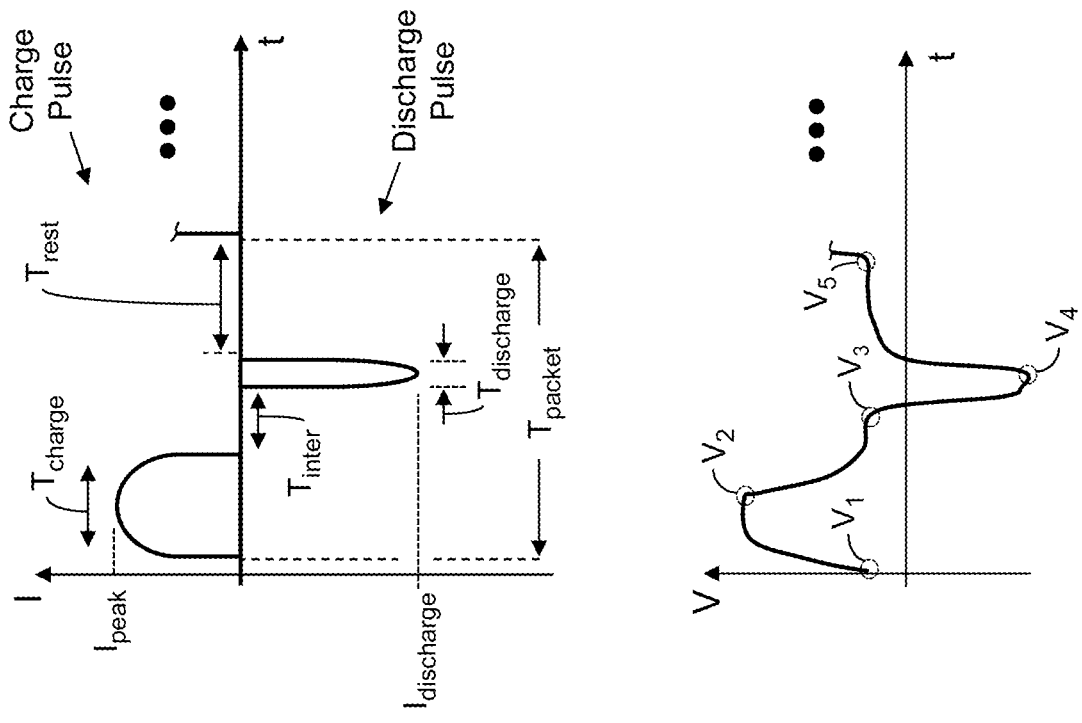
Figure 14A:
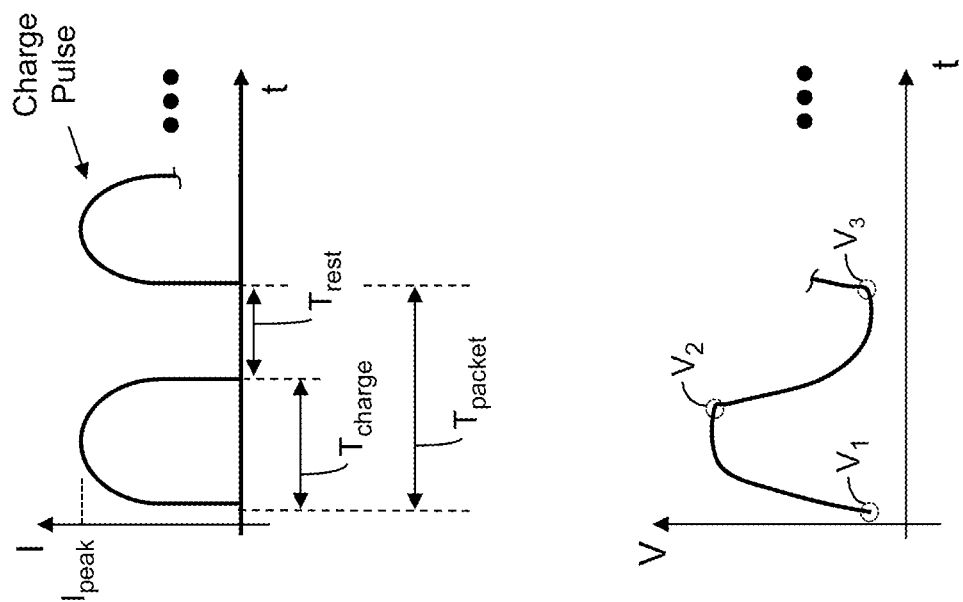
Figure 15A:
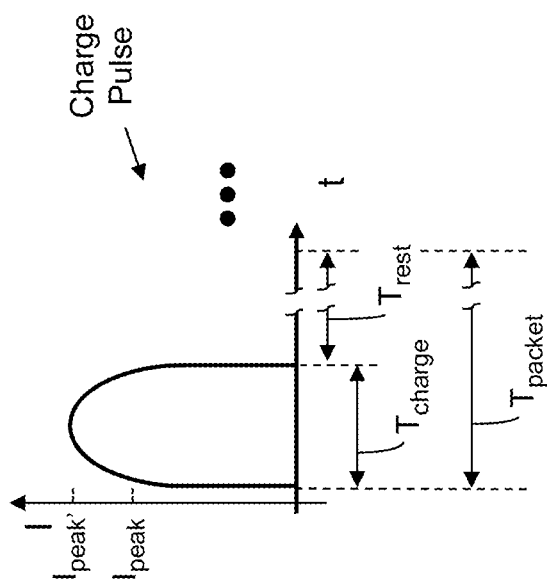
Figure 15A:
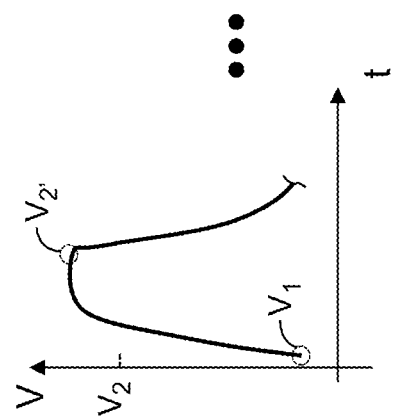
Figure 15B:
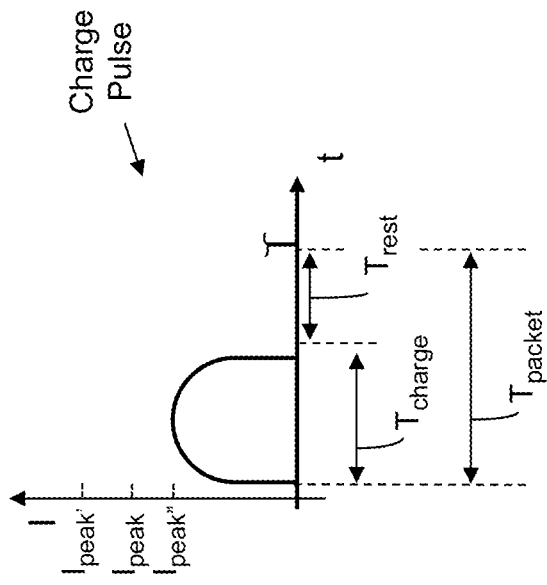
Figure 15B:
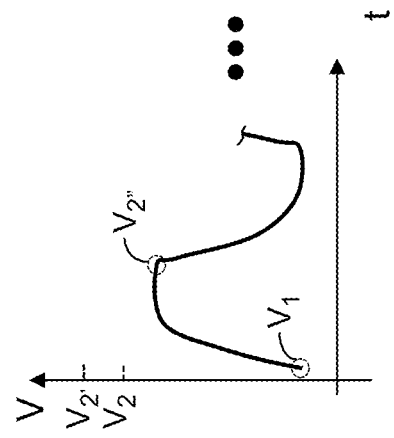
Figure 16A:
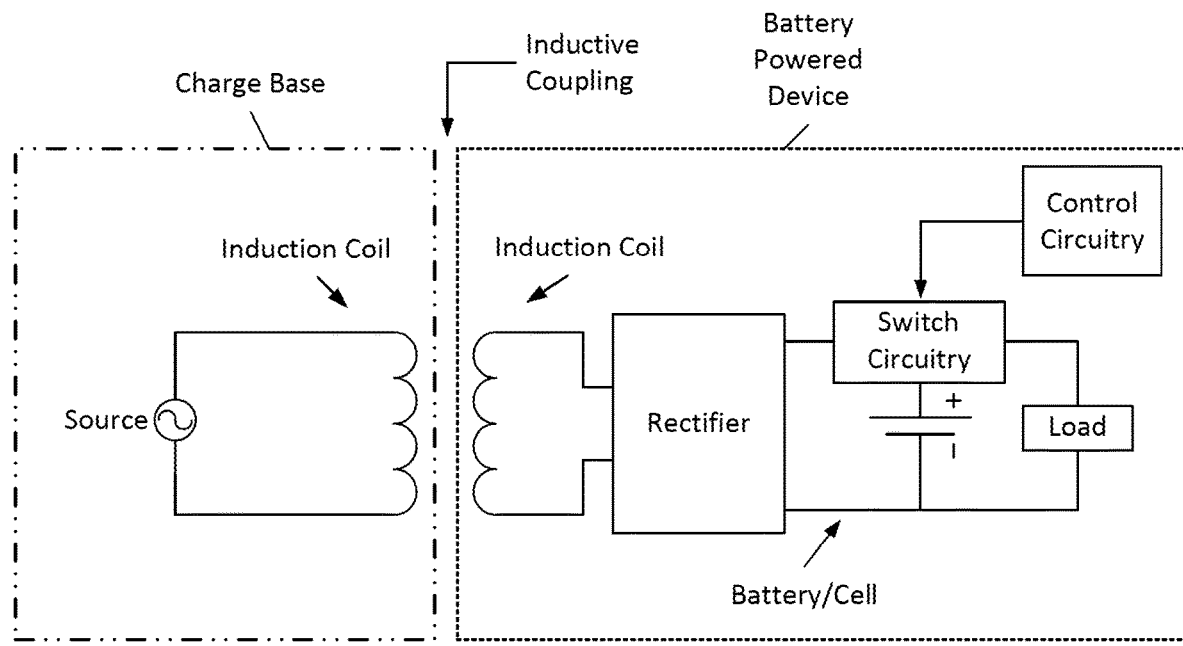
Figure 16B:
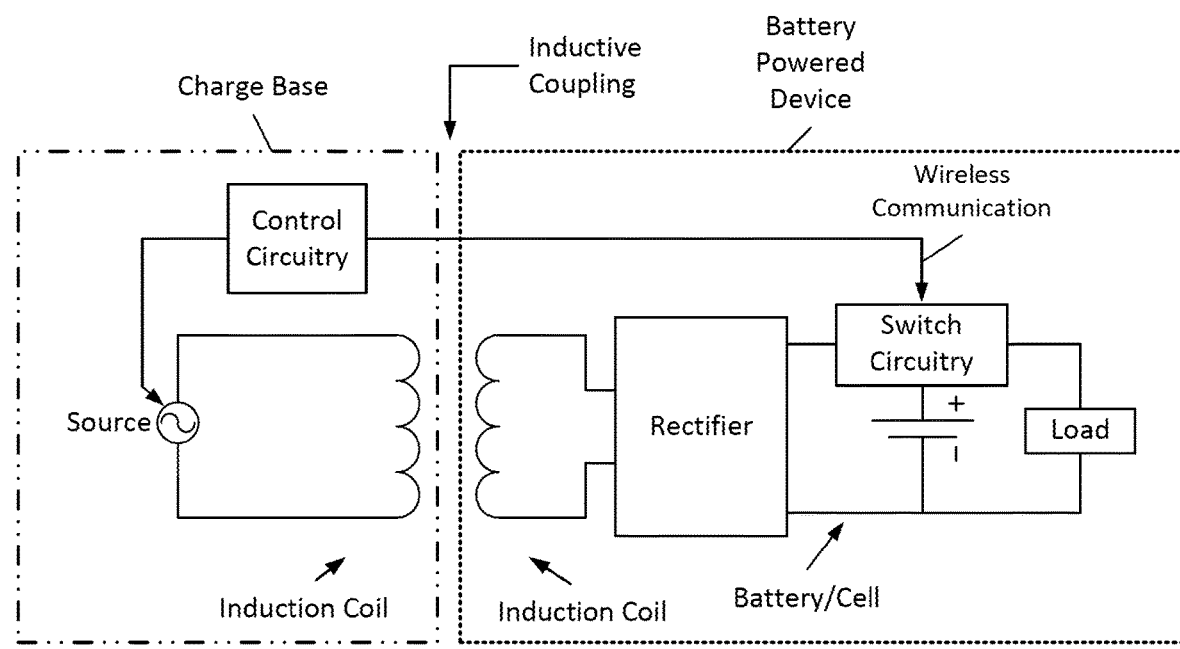

FIG. 1A illustrates an exemplary embodiment of a wireless charging system, in conjunction with a battery/cell, according to at least certain aspects of the present inventions, wherein the wireless charging system includes a charge base having an induction coil which is connected to a source which, although not illustrated, may be derived from a current or voltage source (for example, current or voltage provided by a conventional wall outlet that is connected, for example, to the electrical grid), and a battery powered device, also having an induction coil, which, in combination with the induction coil in the charge base, form an electrical transformer; the battery powered device also includes a rectifier (for example, full-wave or half-wave) to generate rectified current and/or voltage pulses which is substantially applied to the battery/cell during the charging operation; notably, where the rectifier is a full-wave or half-wave rectifier, in one embodiment, the wireless charging system generates a plurality of current or voltage pulses based on or corresponding to the full-wave or half-wave rectified current and/or voltage signal (from the rectifier) which is subsequently applied to the battery/cell during the charging operation;

FIG. 1B is an illustration of a prior art full-wave rectifier; notably, the present inventions may employ any rectifier circuitry and techniques now known or later developed (including those described and/or illustrated in herein) that generate a plurality of unipolar pulses (for example, half-wave or full-wave) from an input AC signal;

FIGS. 2A and 2B illustrate exemplary embodiments of a wireless charging system which, in addition to the induction coils, includes switch circuitry and control circuitry wherein the control circuitry manages or controls the charging operation of the battery via electrically engaging or disengaging the battery from the charging circuitry, according to at least certain aspects of the present inventions; in one embodiment, the system includes monitor circuitry, which provides charging conditions of, for example, the battery/cell (for example, temperature, current and/or voltage data), the charging circuitry and/or the housing, during the charging process, according to at least certain aspects of the present inventions; notably, the monitor circuitry may include one or more voltage and/or current sensors (for example, voltmeter and/or current meter) to determine, measure and/or monitor a voltage at the terminals of the battery/cell and/or a current through the battery/cell;

FIG. 3 illustrates an exemplary embodiment of a wireless charging system which, in addition to the induction coils, includes a programmable rectifier and control circuitry, according to at least certain aspects of the present inventions, wherein the control circuitry controls one or more characteristics of the rectified current and/or voltage output pulses output by rectifier (for example, pulse amplitude, pulse duration, period/frequency, the existence and/or duration of rest periods between pulses and/or whether the output is full-wave or half-wave rectified current and/or voltage pulses);

FIG. 4 illustrates an exemplary embodiment of wireless charging systems which, in addition to the induction coils, includes a rectifier, control circuitry and pulse shaping circuitry according to at least certain aspects of the present inventions;

FIGS. 5A and 5B illustrate exemplary embodiments of wireless charging systems which, in addition to the induction coils, includes a programmable rectifier, control circuitry and pulse shaping circuitry according to at least certain aspects of the present inventions; the control circuitry may control one or more characteristics of the rectified current and/or voltage output pulses output by rectifier; notably, in one embodiment, the control circuitry controls one or more characteristics of the operation of the pulse shaping circuitry on the unipolar full-wave or half-wave rectified current and/or voltage output pulses that are output by rectifier circuitry (FIG. 5B); and, as such, the control circuitry may implement adaptive charging techniques via the programmable rectifier as well as the programmable pulse shaping circuitry;

FIG. 5C illustrates an exemplary embodiment of wireless charging systems which, in addition to the induction coils, includes a rectifier, control circuitry and pulse shaping circuitry according to at least certain aspects of the present inventions; notably, the control circuitry may control one or more characteristics of the operation of the pulse shaping circuitry on the unipolar full-wave or half-wave rectified current and/or voltage output pulses that are output by rectifier circuitry;

FIGS. 6-8 illustrate exemplary embodiments of wireless charging systems which, in addition to the induction coils, includes a programmable rectifier, control circuitry and monitor circuitry, which provides charging conditions of, for example, the battery/cell (for example, temperature, current and/or voltage data), the charging circuitry and/or the housing, during the charging process, according to at least certain aspects of the present inventions; the pulse shaping circuitry in FIGS. 7 and 8 may modify one or more characteristics of the unipolar full-wave or half-wave rectified current and/or voltage output pulses that are output by rectifier circuitry; notably, the monitor circuitry may be implemented in any of the embodiments described and/or illustrated herein; the control circuitry, using data from the monitor circuitry, may implement one or more adaptive charging techniques via the programmable rectifier and/or the programmable pulse shaping circuitry;

FIGS. 9A-9E and 9G illustrate exemplary embodiments of wireless charging systems (or portions thereof) wherein the charge base includes control circuitry to implement a charging sequence or operation (for example, a predetermined charging sequence or operation—whether or not adaptive) according to at least certain aspects of the present inventions; the control circuitry may control (i) the AC source employed to generate the alternating electromagnetic field from within a charge base and/or (ii) the induction coil in the battery powered device (see, for example, FIGS. 9A-9D); the control circuitry in turn may program or configure the source via wired or wireless techniques to adjust the amplitude and period/frequency of the AC signal output by the source; in addition thereto, or in lieu thereof, in another embodiment the control circuitry controls a programmable rectifier disposed in/on the battery power device (see, for example, FIG. 9E) to implement or modify one or more characteristics of the unipolar full-wave or half-wave rectified current and/or voltage output pulses output by rectifier circuitry (for example, pulse amplitude, pulse duration, period/frequency, the existence and/or duration of rest periods between pulses and/or whether the output is full-wave or half-wave rectified current and/or voltage pulses); notably, control signals and data that is/are transmitted between circuitry in the charge base and circuitry in the battery powered device may be via wireless communication techniques (for example, through the induction coils); in one embodiment, monitor circuitry is included in the battery powered device to provide charging conditions of, for example, the battery/cell (for example, temperature, current and/or voltage data), during the charging process (see, for example, FIG. 9G);

FIGS. 9F and 9H illustrate exemplary embodiments of wireless charging systems wherein the charge base and the battery powered device include control circuitry to implement a charging sequence or operation of the battery/cell (for example, a predetermined charging sequence or operation—whether or not adaptive) according to at least certain aspects of the present inventions; the control circuitry may communicate with circuitry and elements in the battery powered device wirelessly (for example, via or over the induction coils); notably, although not all illustrated, the present inventions which employ control circuitry in both the charge base and the battery powered device in any of the combinations or permutations of rectifiers (i.e., programmable or non-programmable rectifiers), pulse shaping circuitry (i.e., programmable or non-programmable pulse shaping circuitry) and monitor circuitry architectures described herein;

FIGS. 9I and 9J illustrate exemplary embodiments of wireless charging systems wherein the charge base and the battery powered device include control circuitry to implement a charging sequence or operation of the battery/cell (for example, a predetermined charging sequence or operation—whether or not adaptive) and the battery powered device includes monitor circuitry, according to at least certain aspects of the present inventions; the monitor circuitry, in one embodiment, provides data which is representative of the charging conditions of, for example, the battery/cell (for example, temperature, current and/or voltage data), the charging circuitry and/or the housing, during the charging process; notably, the monitor circuitry may be any circuitry, architecture and/or configuration now known or later developed; the control circuitry, in one embodiment, may use data from the monitor circuitry, to implement one or more adaptive charging techniques via control of the source in the charge base; notably, in one embodiment, the control circuitry in the charge base communicates with circuitry and elements in the battery powered device wirelessly (for example, via or over the induction coils);

FIGS. 10A-10E illustrate exemplary embodiments of wireless charging systems wherein the battery powered device includes control circuitry to implement a charging sequence or operation of the battery/cell (for example, a predetermined charging sequence or operation—whether or not adaptive) according to at least certain aspects of the present inventions; the control circuitry may control the source employed to generate an alternating electromagnetic field from within a charge base (see, for example, FIGS. 10A and 10B) and/or the induction coil in the battery powered device (for example, enable or select one of a plurality of tap outputs of the induction coil) which employs the power from the electromagnetic field and converts it back into electrical current (see, for example, FIG. 10C); the control circuitry in the battery powered device may program or configure (via wireless communication techniques using the induction coils) the source to adjust the amplitude and period/frequency of the source; in another embodiment, the control circuitry may also control a programmable rectifier disposed in/on the battery power device (see, for example, FIG. 10B) to implement or modify one or more characteristics of the full-wave or half-wave rectified current and/or voltage output pulses output by rectifier circuitry (for example, pulse amplitude, pulse duration, period/frequency, the existence and/or duration of rest periods between pulses and/or whether the output is full-wave or half-wave rectified current and/or voltage pulses); monitor circuitry may be included in the battery powered device to provide charging conditions of, for example, the battery/cell (for example, temperature, current and/or voltage data), during the charging process (see, for example, FIGS. 10D and 10E); notably, similar to above, although not all illustrated, the present inventions which employ charging circuitry in the battery powered device in any of the combinations or permutations of rectifiers (i.e., programmable or non-programmable rectifiers), pulse shaping circuitry (i.e., programmable or non-programmable pulse shaping circuitry) and monitor circuitry architectures described herein;

FIGS. 11A-11F illustrate exemplary full-wave or half-wave rectified current pulse waveforms employed by the wireless charging system to charge the battery/cell according to at least certain aspects of the present inventions; entirely or partially full-wave rectified current pulse signals (see, for example, FIGS. 11A and 11C) or entirely or partially half-wave rectified current pulse signals (see, for example, FIGS. 11B and 11C) may include one or more discharge pulses (which may be portions of the signal output by the induction coil in the battery powered device that are not rectified) (see, for example, FIGS. 11D and 11E); moreover, the pattern of pulses output by the induction coil in the battery powered device may include one or more (or all) periodic patterns (whether in relation to the charge pulses and/or discharge pulses or not); the amplitude and/or pulse width of one or more of the charge pulses and/or discharge pulses may vary relative to other pulses (see, for example, FIGS. 11E and 11F); in one embodiment, the full-wave or half-wave rectified current pulse signals are substantially directly applied to the battery/cell during the charging process; in another embodiment, the full-wave or half-wave rectified current pulse signals are applied to the pulse shaping circuitry whose output is provided to the battery/cell during the charging process;

FIGS. 12A-12N illustrate exemplary charge and/or discharge packets of the charging and discharging signals, according to at least certain aspects of the present inventions, wherein such charge and discharge packets may include one or more charge pulses and one or more discharge pulses; notably, in one embodiment, each charge signal may include a plurality of packets (for example, about 100 to about 50,000 packets) and, in one embodiment, each packet may include a plurality of charge pulses, discharge pulses and rest periods; notably, the pulses may be shaped (for example, rectangular, triangle, sinusoidal or square) via the rectifier and/or pulse shaping circuitry; in one exemplary embodiment, the charge and/or discharge pulses of the packet may include a temporal duration of between about 1 ms to about 2000 ms, and preferably less than 1000 ms; moreover, as discussed in detail below, one, some or all of the characteristics of the charge and discharge pulses (for example, pulse amplitude, pulse width/duration and pulse shape) are programmable and/or controllable via charging circuitry wherein the amplitude of the positive and/or negative pulses may vary within the packet (and are programmable and/or controllable), the duration and/or timing of the rest periods may vary within the packet (and are programmable and/or controllable) and/or, in addition, such pulses may be equally or unequally spaced within the packet; the combination of charging pulses, discharging pulses and rest periods may be repetitive and thereby forms a packet that may be repeated; all combinations or permutations of pulse, pulse characteristics, periods, packets and signal characteristics and configurations are intended to fall within the scope of the present inventions; notably, such one or more charge pulses and/or one or more discharge pulses (including, for example, pulses of charge and/or discharge packets) may be generated the programmable rectifier and/or pulse shaping circuitry of the charging circuitry in the battery powered device;

FIG. 13 is a flowchart of exemplary adaptive process of monitoring and controlling one or more characteristics of operating and/or charging process of the battery/cell, according to certain aspects of the present inventions, including measuring one or more parameters of the battery/cell and/or charging process, and determining whether the one or more parameters are within-specification or out-of-specification; where the one or more parameters are not within-specification, the control circuitry may adapt the charge and/or discharge pulses (and/or charge packets);

FIG. 14A illustrates an exemplary charge packet having a charge pulse including a charging period ($T_{charge}$) followed by a rest period ($T_{rest}$) wherein the period of the charge packet is identified as $T_{packet}$, according to certain aspects of the present inventions; an exemplary terminal voltage response of the battery/cell to such charge packet is illustrated wherein a first voltage ($V_1$) is identified (which correlates to the beginning of the charge pulse), a second voltage ($V_2$) is identified (which correlates to the end of the charge pulse and/or the peak of the change in the terminal voltage due to the charge pulse) and a third voltage ($V_3$) is identified (which correlates to the end of the charge packet, the beginning of an immediately subsequent packet (for example, charge or discharge packet) and/or the end of the rest period of the charge packet);

FIG. 14B illustrates an exemplary charge packet having a charge pulse (which injects charge into the battery/cell) and a discharge pulse (which removes charge from the battery/cell) wherein the charge pulse includes a charging period ($T_{charge}$) and the discharge pulse includes a discharging period ($T_{discharge}$), according to certain aspects of the present inventions; notably, in this exemplary charge packet, an intermediate rest period ($T_{inter}$) is disposed between the charge and discharge pulses, and a rest period ($T_{rest}$) is disposed after the discharge pulse and before the next packet; an exemplary terminal voltage response of the battery/cell to such charge packet is illustrated wherein a first voltage ($V_1$) is identified (which correlates to the beginning of the charge pulse), a second voltage ($V_2$) is identified (which correlates to the end of the charge pulse and/or the peak of the change in the terminal voltage due to the charge pulse), a third voltage ($V_3$) is identified (which correlates to the beginning of the discharge pulse), a fourth voltage ($V_4$) is identified (which correlates to the end of the discharge pulse and/or the peak of the change in the terminal voltage due to the discharge pulse) and a fifth voltage ($V_5$) is identified (which correlates to the end of the charge packet, the beginning of an immediately subsequent packet (for example, charge or discharge packet) and/or the end of the rest period of the charge packet); notably, as discussed in detail below, one, some or all of the characteristics of the charge pulses (for example, pulse amplitude, pulse width/duration and pulse shape) are programmable and/or controllable via charging circuitry wherein the amplitude of the positive and/or negative pulses may vary within the packet (and are programmable and/or controllable), the duration and/or timing of the rest periods may vary within the packet (and are programmable and/or controllable) and/or, in addition, such pulses may be equally or unequally spaced within the packet; the combination of charging pulses, discharging pulses and rest periods may be repetitive and thereby forms a packet that may be repeated; all combination or permutations of pulses, pulse characteristics, periods, packets and signal characteristics are intended to fall within the scope of the present inventions; moreover, discharge packets may have similar characteristics as charge packets except, however, a net charge is removed from the battery/cell; for the sake of brevity, the discussion/illustration with respect to discharge packet are not be repeated;

FIG. 15A illustrates an exemplary charge packet having a charge pulse wherein the amplitude of the charge pulse is greater than the amplitude of the charge pulse of FIG. 14A wherein the charging circuitry, in response to instructions from the control circuitry, adjust the amplitude of the charge pulse to increase the responsive terminal voltage so that the change in terminal voltage of the battery/cell is within a predetermined range and/or below a predetermined value during a charging or recharging sequence, operation or cycle; an exemplary terminal voltage response of the battery/cell to such a charge pulse is illustrated wherein a first voltage ($V_1$) is identified (which correlates to the beginning of the charge pulse) and a second voltage ($V_{2'}$) is identified (which correlates to the end of the charge pulse and/or the peak of the change in the terminal voltage due to the charge pulse) wherein the amplitude of the responsive terminal voltage is greater than the amplitude of the terminal voltage of the battery/cell which is responsive to the charge pulse of FIG. 14A;

FIG. 15B illustrates an exemplary charge packet having a charge pulse wherein the amplitude of the charge pulse is less than the amplitude of the charge pulse of FIG. 14B wherein the charging circuitry, in response to instructions from the control circuitry, adjusts the amplitude of the charge pulse to decrease the responsive terminal voltage so that the change in terminal voltage of the battery/cell is within a predetermined range and/or below a predetermined value during a charging or recharging sequence, operation or cycle; an exemplary terminal voltage response of the battery/cell to such a charge pulse is illustrated wherein a first voltage ($V_1$) is identified (which correlates to the beginning of the charge pulse) and a second voltage ($V_{2''}$) is identified (which correlates to the end of the charge pulse and/or the peak of the change in the terminal voltage due to the charge pulse) wherein the amplitude of the responsive terminal voltage is less than the amplitude of the terminal voltage of the battery/cell which is responsive to the charge pulse of FIG. 14B; and FIGS. 16A and 16B illustrate exemplary embodiments of a wireless charging system including switch circuitry to controllably connect/disconnect the battery to/from the charging circuitry and/or a load, according to at least certain aspects of the present inventions, wherein the switch circuitry, during the charging sequence or process, responsively connects the battery to receive the charge pulses (in this illustrative embodiment, from the rectifier) or to a load (for example a resistor or active current sink (such as a FET)) to thereby "generate" a discharge pulse (see, for example, FIGS. 11D, 11E, 12C-12G, 12I-12N, 14B); notably, the switch circuitry, battery-load configuration may be implemented in any of the embodiments described and/or illustrated herein (including the illustrative embodiments of FIGS. 2-10E); moreover, the control circuitry may be disposed in the charge base and/or in the battery powered device; for the sake of brevity, separate discussions and illustrations of such embodiments are not be set forth separately herein.

Again, there are many inventions described and illustrated herein. The present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For the sake of brevity, many of those combinations and permutations are not discussed separately herein.

Moreover, many other aspects, inventions and embodiments, which may be different from and/or similar to, the aspects, inventions and embodiments illustrated in the drawings, will be apparent from the description, illustrations and claims (if any), which follow. In addition, although various features and attributes have been illustrated in the drawings and/or are apparent in light thereof, it should be understood that such features and attributes, and advantages thereof, are not required whether in one, some or all of the embodiments of the present inventions and, indeed, need not be present in any of the embodiments of the present inventions.

DETAILED DESCRIPTION

In a first aspect, the present inventions are directed to circuitry for and methods of wirelessly charging a battery/cell using wireless charging circuitry and system. The wireless charging circuitry may be based on inductive coupling wherein an induction coil in the base and an induction coil in the battery powered device form an electrical transformer. The output of the induction coil in the battery powered device is provided to rectifier circuitry which generates an unregulated current and/or voltage. For example, in one embodiment, the wireless charging circuitry includes a full-wave or half-wave rectifier circuitry to generate corresponding current and/or voltage pulses (that is, pulse based on or corresponding to the full-wave or half-wave rectified signal from the rectifier circuitry). The rectified current and/or voltage pulses, without subsequent regulation via a regulator, are employed as the charging signal that is applied to the battery during the charging operation. That is, in one embodiment, the charging circuitry does not include a current and/or voltage DC regulator, electrically coupled between the full-wave or half-wave rectifier circuitry and the output of the charging circuitry, to generate a regulated current and/or voltage charging signal employed to charge the battery/cell during a charging process; rather, the wireless charging circuitry generates a plurality of charge pulses, based on the output of the rectifier circuitry (which correspond to the unipolar full-wave or half-wave rectified current and/or voltage pulses therefrom), and applies the charge pulses (or a form thereof) to the battery/cell to implement the charging process.

With reference to FIGS. 1A and 1B, in one embodiment, the wireless charging circuitry and system is based on inductive wireless charging and includes a charge base having an induction coil electrically coupled to an alternating current (AC) source (which may be coupled to, for example, a 110v or 220v (50 Hz or 60 Hz) AC power source such as a conventional wall or home power outlet). In one embodiment, the AC source includes a fixed amplitude and frequency (for example, 100-200 kHz). In other embodiments, the source may have a programmable/variable amplitude and/or frequency which are/is, for example, controlled in operation (for example, adaptively) via control circuitry in the charge base and/or battery powered device.

The circuitry and system further includes a battery powered device also having an induction coil. The induction coil of the battery powered device, which inductively couples with or to the induction coil of the charge base, employs the power from the electromagnetic field and converts the electromagnetic field created by the induction coil of the charge base back to electrical current. Here, the two induction coils, when in suitable or prescribed proximity, combine to form an electrical transformer that employs an electromagnetic field to transfer energy.

Notably, the wireless charging circuitry and system may use any form of inductive coupling now known or later developed—including systems implementing resonant inductive coupling that allow greater distances between the coils. For example, in one embodiment, the near field wireless transmission of electrical energy between two coils may be tuned to resonate at the same frequency—thereby wirelessly transmitting or transferring electrical energy from one coil to the other. In another embodiment, the two induction coils simply "form" an electrical transformer which has no tuning involved thereby passing a wide range of frequencies. For the avoidance of doubt, any form of inductive coupling now known or later developed is intended to fall within the scope of the present inventions.

The output of the induction coil of the battery powered device is electrically coupled to a rectifier which, in one embodiment, generates a rectified current and/or voltage corresponding to the current or voltage output by the induction coil. In one embodiment, the rectifier is a full-wave rectifier which generates a plurality of unipolar full-wave rectified current and/or voltage pulses. (See, for example, FIG. 1B). In another embodiment, the rectifier is a half-wave rectifier which generates a plurality of unipolar half-wave rectified current and/or voltage pulses. Indeed, the present invention may employ any rectifier circuitry and techniques now known or later developed (including those described and/or illustrated in herein) that generate a plurality of unipolar pulses (for example, half-wave or full-wave) from an input AC signal.

The plurality of unipolar pulses output by the rectifier form the charge pulses applied to the battery/cell during the charging sequence or process. That is, in this embodiment, the rectified current and/or voltage pulses, without subsequent regulation via a DC regulator, form the charging signal that is applied to the battery. Thus, in this embodiment, the charging circuitry does not include a DC regulator, electrically coupled between the full-wave or half-wave rectifier circuitry and the output of the charging circuitry, to generate a regulated current and/or voltage charging signal. Rather, the wireless charging circuitry of this embodiment generates a plurality of charge pulses, applied to the battery during a charging sequence, based on the output of the rectifier wherein the charge pulses correspond to the plurality of unipolar full-wave or half-wave rectified current and/or voltage pulses therefrom (see, for example, FIGS. 11A and 11B, respectively).

With reference to FIG. 2A, control circuitry disposed in the battery powered device may manage and/or control one or more aspects of the charging process, sequence or operation. For example, in one embodiment, the control circuitry, after determining the amount of charge stored in the battery/cell and a maximum amount of charge capable of being stored, may monitor the increase and/or decrease in state of charge (SOC) of the battery/cell during one or more charge cycles and/or discharge cycles, respectively. Indeed, when the control circuitry determines the battery/cell is fully charged (e.g., 100% SOC), the control circuitry electrically decouples or disengages the battery/cell from the charging circuitry via the switch circuitry; other techniques of terminating the charging process are available—including disabling the charging circuitry (for example, via disabling the source) or disabling the rectifier.

Notably, in one embodiment, the control circuitry employs coulomb counting to monitor, measure, estimate and/or determine the incremental changes in SOC due to a charge cycle or discharge/use. For example, during the charging process, sequence or operation, the control circuitry may sum the amount of charge applied to the battery due to the charge pulses from the rectifier. With reference to FIG. 2B, the control circuitry may receive data from monitor circuitry in order to monitor, measure, estimate and/or determine the SOC of the battery and/or incremental changes therein. Other techniques are suitable including those described and/or illustrated in U.S. patent application Ser. Nos. 13/111,902, 13/167,782, 13/366,352, 13/626,605, 13/657,841, 13/747,914, 13/836,235, 14/003,826, 14/075, 667 and/or 14/252,422—indeed, the control circuitry may employ any techniques now known (including those techniques described herein) or later developed to determine the SOC of the battery as well as monitor changes in the SOC of the battery (for example, incremental changes) to monitor the increase or decrease in SOC based on the operation of the battery/cell in order to manage the charging process, sequence or operation.

In one embodiment, the amount of charge contained in each pulse from the rectifier is a subset of a "larger" charge pulse which the control circuitry employs to determine or trigger operations in/of a charging sequence. (See inset in FIG. 11A). Under these circumstances, the control circuitry may monitor the amount of charge applied to the battery/cell via the charge pulses from the rectifier using a coulomb counting technique. After the control circuitry determines a given amount of charge is applied to the battery/cell (for example, the equivalent of a "larger" charge pulse), the control circuitry may trigger certain events or procedures in a charge process or sequence (for example, determine an operating or charging condition of the battery and/or determine whether a charge packet has been applied to the battery and/or when and if to apply a discharge pulse which may be a defined in a predetermined charging sequence).

The rectifier may be fixed or programmable. In one embodiment, control circuitry controls a programmable rectifier disposed in/on the battery powered device. (See, FIG. 3). Here, the control circuitry may control one or more characteristics of the unipolar full-wave or half-wave rectified current and/or voltage pulses output by the rectifier circuitry (for example, gain, pulse amplitude, pulse duration, period/frequency, the existence and/or duration of rest periods between pulses and/or whether the output is full-wave or half-wave rectified unipolar current and/or voltage pulses). Notably, the fixed or programmable rectifier may be employed in any embodiment set forth herein (whether or not a programmable rectifier or a fixed rectifier is separately illustrated therein). Moreover, as discussed in detail below, the control circuitry may be disposed on/in the charge base wherein communication with the programmable rectifier may be via wireless or wired techniques.

In one embodiment, the programmable rectifier includes a diode bridge having switch circuitry incorporated therewith (for example, one or more switches disposed therein to couple or decouple one or more diodes from the bridge) to thereby modify the pulse output between a full-wave or half-wave rectified current and/or voltage pulse stream. In another embodiment, the characteristics of the pulses output by the rectifier are adjusted by adjusting, coupling and/or decoupling one or more components of voltage-multiplying type rectifier (for example, capacitors).

With reference to FIG. 4, the wireless charging circuitry and system may include pulse shaping circuitry electrically coupled to the rectifier to, for example, shape (for example, attenuate) the unipolar output pulses of the rectifier that exceed a given amplitude. In one embodiment, the pulse shaping circuitry includes limiter circuitry, for example, a pin diode. The pulse shaping circuitry including a limiter circuit may clip or limit the amplitude of one or more (or all) of the rectified pulses. Such a configuration may provide the battery protection during charging, for example, by managing, controlling and/or prohibiting the amplitude of the pulses from exceeding a predetermined level.

The pulse shaping circuitry may be fixed or programmable. (See, for example, FIGS. 4, 5A-5C). Where the pulse shaping circuitry is programmable, control circuitry may control one or more characteristics of the operation of the circuitry on the full-wave or half-wave rectified current and/or voltage output pulses that are output by rectifier circuitry. Indeed, the control circuitry may implement adaptive charging techniques via the programmable pulse shaping circuitry. Notably, the fixed or programmable pulse shaping circuitry may be employed in any embodiment set forth herein (whether or not the pulse shaping circuitry is actually illustrated in such embodiment).

The pulse shaping circuitry may generate/output pulses of any shape, for example, rectangular, triangle, sinusoidal or square and/or the same shape and/or width or different shape and/or width. (See, for example, FIGS. 12A-12N). Here, the pulse shaping circuitry receives the unipolar output pulses of the rectifier and generates pulses (for example, in packet form—albeit that it need not be in packet form) having a predetermined, fixed and/or programmable shape which are employed to charge the battery/cell.

Notably, in one embodiment, the charge pulses applied to the battery/cell may be periodic and/or in a predetermined sequence relative to the charge and/or discharge (if any) pulses. In another embodiment, the sequence's charge and/or discharge (if any) pulses may be in a sequence which is partially or fully aperiodic (which, in one embodiment, is determined and controlled by the control circuitry—for example, based on the operating conditions or characteristics of the battery/cell). Indeed, all combinations or permutations of pulse, pulse characteristics, periods, packets and signal characteristics and configurations of the pulses of the charge/discharge pulses and charge/discharge packets are intended to fall within the scope of the present inventions.

With reference to FIGS. 6-8, the wireless charging circuitry and system may include monitor circuitry, electrically coupled to the terminals of the battery/cell, to measure, monitor, sense, detect and/or sample (for example, on an intermittent, continuous and/or periodic basis, and/or in response to a triggerable event (for example, when the voltage and/or current output by charging circuitry changes in accordance with a predetermined charging sequence)) one or more conditions or characteristics of the battery/cell, the charging circuitry and/or the housing during the charging process (see, for example, U.S. patent application Ser. Nos. 13/626,605, 13/657,841 and 13/836,235). The monitor circuitry may include one or more voltmeters, and/or one or more current meters, and/or one or more temperature sensors. In one embodiment, the monitor circuitry implements Kelvin-type measurement configurations in that little to no current is employed or required for the monitor circuitry to determine the voltage at the terminals of the battery/cell and the current through the battery/cell. The monitor circuitry may consist of a single component (whether in integrated circuit or discrete form) or a multiplicity of components (whether in integrated circuit form, discrete form or otherwise), which are active and/or passive type components, and which are electrically coupled to measure, monitor, sense, detect and/or sample one or more conditions or characteristics of the battery/cell including, for example, (i) the terminal voltage of the battery/cell and/or (ii) current applied to or removed from the battery/cell during the charging operation.

The present inventions may employ any monitor circuitry and/or measuring or monitoring techniques, whether described herein, now known or later developed, to acquire such current, voltage, temperature and/or other data; all such monitor circuitry and measuring or monitoring techniques are intended to fall within the scope of the present inventions. As mentioned above, monitor circuitry provides data, which is representative of the condition or characteristics of the battery/cell (for example, (i) the terminal voltage of the battery/cell and/or (ii) current applied to or removed from the battery/cell during the charging operation) to, for example, control circuitry. In one embodiment, the control circuitry receives voltage and/or current feedback data from the monitor circuitry and, in response thereto, determines whether such data is within-specification or out-of-specification, and if out-of-specification, generates instructions or control signals to directly or indirectly control charging circuitry (for example, the source, rectifier and/or pulse shaping circuitry) and thereby adjust the voltage of and/or current applied to and/or removed from the battery/cell during the charging operation. Notably, the monitor circuitry may be implemented in any of the embodiments described and/or illustrated herein (whether or not the monitor circuitry is illustrated therein).

Figure 10A:
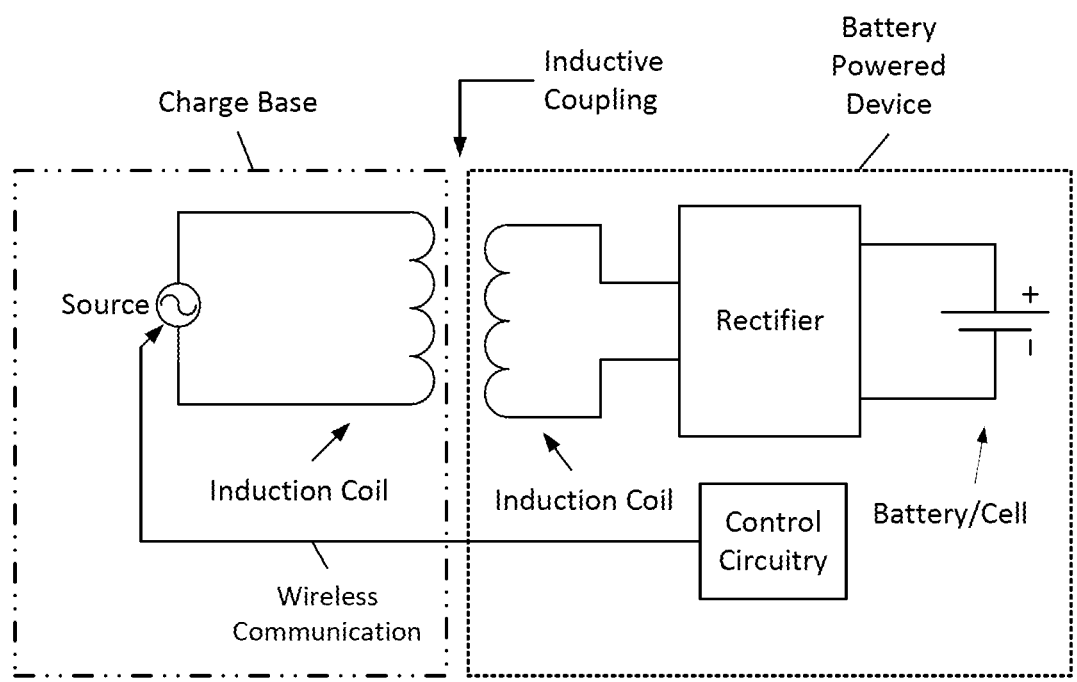
Figure 10B:
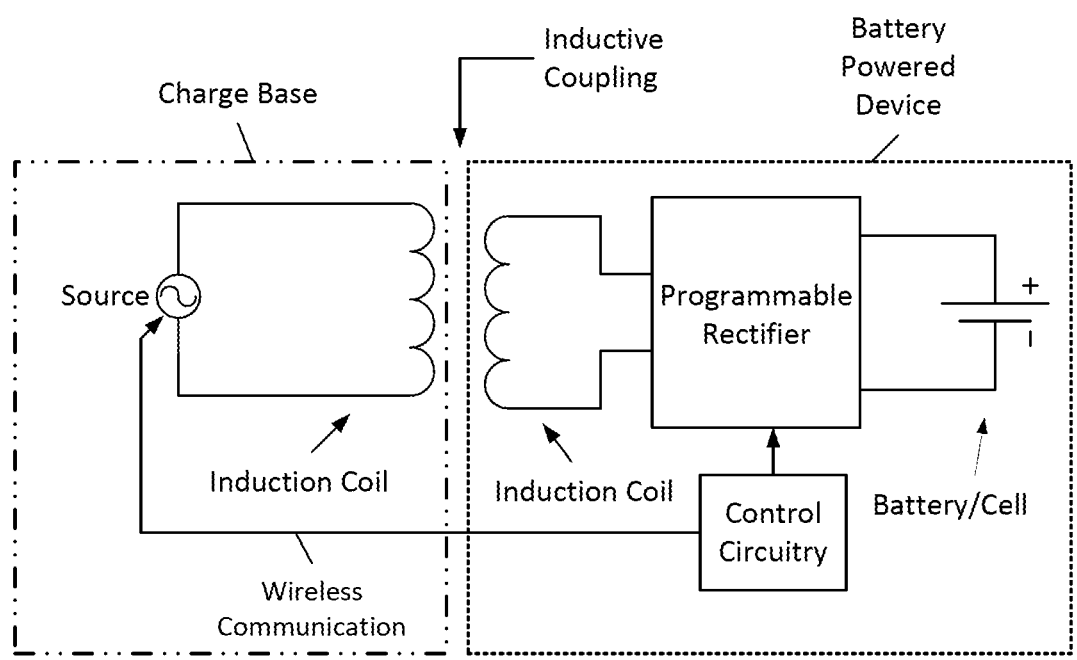
Figure 10C:
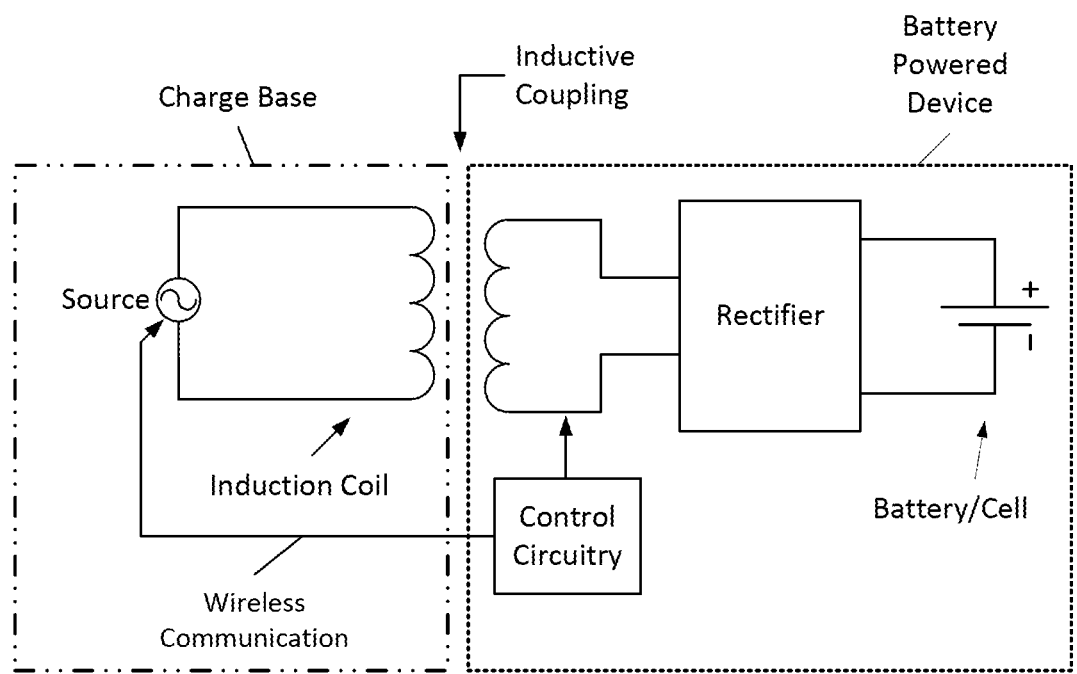
Figure 10D:
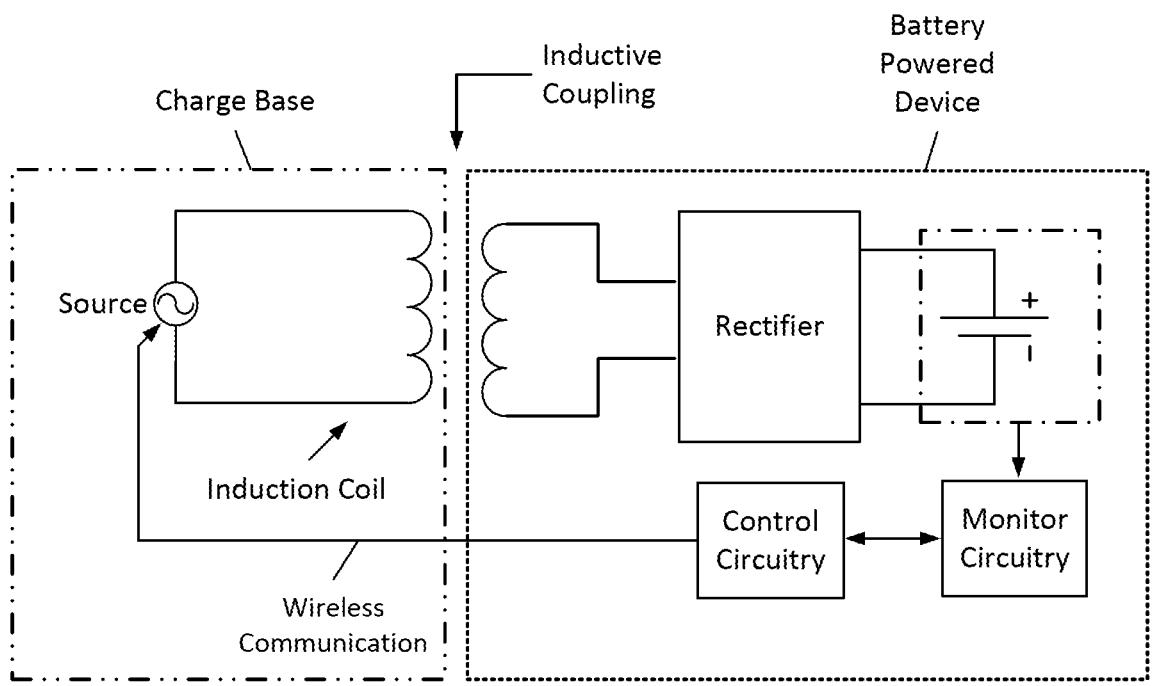
Figure 10E:
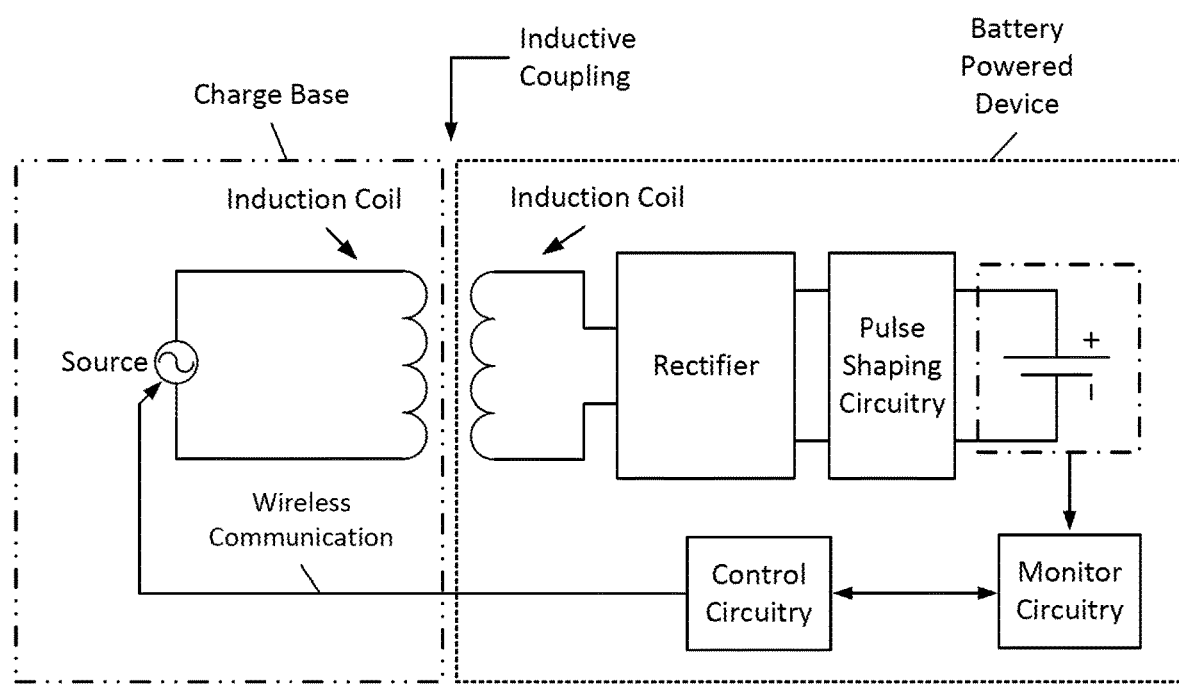

As intimated above, in those embodiments including control circuitry, such control circuitry may be disposed in the charge base and/or battery powered device to control the charging operation, sequence and/or process. With reference to FIGS. 9A and 10A, the control circuitry may program or configure the AC source including, for example, amplitude and period/frequency of the AC signal output by the source. Indeed, as discussed in detail below, the control circuitry may implement (in conjunction with other circuitry) adaptive charging techniques.

In addition thereto, or in lieu thereof, the control circuitry may manage or control (for example, adaptively) the charging operation of the battery via control of other circuitry or elements of the wireless charging circuitry and system. The control circuitry may control or program the response of the induction coil in the battery powered device, the operation of the rectifier and/or the operation of the pulse shaping circuitry. For example, in the context of the induction coil in the battery powered device, control circuitry may enable or select an active tap (from a plurality of taps) of the induction coil in the battery powered device in order to control the output to the rectifier (for example, step-up or step down the voltage/current of the output of the induction coil). Here, the control circuitry may configure switch circuitry to connect a selected tap (which is one of a plurality of taps) of the induction coil in the battery powered device to the rectifier circuitry. In this way, the control circuitry may enable the selected tap of the induction coil and connect that output of the induction coil to the rectifier.

The communication between control circuitry in the charge base or the battery powered device and other circuitry of the wireless charging circuitry and system may be via wired or wireless communication. In one embodiment, the wireless communications (for example, RF or optical communication techniques) may be implemented through the induction coils. (See, for example, FIGS. 9C-9F, 10B and 10C). In addition thereto, or in lieu thereof, a dedicated and/or separate transmission link may be employed (for example, in those embodiments that require high data transfer rates). Notably, where available, suitable, desirable, advantageous, practicable and/or feasible, the control circuitry may also communicate via wired communication. Indeed, any technique, protocols and/or circuitry now known or later developed, including wireless and wired techniques, are intended to fall within the scope of the present inventions.

Notably, the control circuitry may include one or more processors, one or more state machines, one or more gate arrays, programmable gate arrays and/or field programmable gate arrays, and/or a combination thereof. Indeed, control circuitry and monitor circuitry may share circuitry with each other as well as with other elements; such circuitry may be distributed among a plurality of integrated circuits which may also perform one or more other operations, which may be separate and distinct from that described herein. Moreover, the control circuitry may perform or execute one or more applications, routines, programs and/or data structures that implement particular methods, techniques, tasks or operations described and illustrated herein. The functionality of the applications, routines or programs may be combined or distributed. In addition, the applications, routines or programs may be implementing by the control circuitry using any programming language whether now known or later developed, including, for example, assembly, FORTRAN, C, C++, and BASIC, whether compiled or uncompiled code; all of which are intended to fall within the scope of the present inventions.

In another aspect, the wireless charging circuitry and system of the present inventions employs adaptive charging techniques. In one embodiment, the adaptation of the charging sequence or process may be based on the charging and/or operating conditions of the battery. For example, the wireless charging circuitry, which is responsive to control signals from control circuitry, generates a plurality of charge pulses based on the rectified current and/or voltage generated by the rectifier. The characteristics of (i) the rectified current and/or voltage (for example, pulse amplitude, pulse duration, period/frequency, the existence and/or duration of rest periods between pulses and/or whether the output is full-wave or half-wave rectified current and/or voltage pulses) and/or (ii) the current and/or voltage pulses applied to the battery/cell (for example, a maximum current applied to the battery/cell during charging operations ($I_{max}$) and/or a maximum terminal voltage during charging operations ($V_{max}$)) may be adapted in accordance with, for example, such parameters as an overpotential (OP) or full relaxation time (FRT) of the battery/cell, a charge pulse voltage (CPV) or a change in CPV, a partial relaxation time (PRT) of the battery/cell, a temperature of the battery/cell ($T_b/c$), and/or a swelling of the battery. An overpotential may be characterized as the voltage difference between the terminal voltage of the battery/cell at the initiation of the charge signal and the terminal voltage of the battery/cell when the battery/cell is at full equilibrium (which may be characterized as when the terminal voltage of the battery/cell is substantially or relatively constant or unchanging under no charging current which, for a conventional lithium ion battery/cell, is typically after a temporal duration of, for example, 1 to 1,000 seconds). The control circuitry may determine the overpotential or "full" relaxation time of the battery/cell based on or using the form, shape and/or rate of decay of the terminal voltage.

With reference to FIGS. 9G-9J, 10D and 10E, the wireless charging circuitry and system of the present inventions includes monitor circuitry to provide data which is representative of the charging conditions of, for example, the battery/cell (for example, temperature, current and/or voltage data), the charging circuitry and/or the housing, during the charging process. As noted above, the monitor circuitry may include one or more voltage and/or current sensors (for example, voltmeter and/or current meter) to determine, measure and/or monitor a voltage at the terminals of the battery/cell and/or a current through the battery/cell during the charging sequence or operation. The control circuitry may employ data from the monitor circuitry to implement one or more adaptive charging techniques. In this regard, the monitor circuitry may provide data to the control circuitry which, in response, generates operating or charging parameters, for example, parameters relating to the response or characteristics of the battery during the charging sequence. Based thereon, the charge circuitry may adjust the operation of the various elements of the system (for example, the source, the response of the induction coil in the battery powered device, and/or the operation of the rectifier and/or pulse shaping circuitry) to address the condition or state of the battery during the charging cycle. Notably, the present inventions may employ any adaptive charging technique now known or later developed—including those discussed herein and/or incorporated by reference.

Notably, in addition thereto, or in lieu thereof, the adaptation of the unregulated current and/or voltage may be based on the operating conditions of the charging circuitry (for example, operating temperature and/or operating efficiency) of one or more (or all) of the charging circuits of the wireless charging circuitry ($T°_{cc}$) and/or an operating temperature of the housing ($T°_h$). Here, control circuitry disposed in the charge base and/or in the battery powered device may evaluate these temperature and efficiency charge parameters and adapt the characteristics of (i) the full-wave or half-wave rectified current and/or voltage and/or (ii) the current and/or voltage pulses applied to the battery/cell in accordance with operating conditions of the charging circuitry and/or an operating temperature of the housing (which may be in lieu of or in addition to the adaptation in accordance with the charging and/or operating conditions of the battery/cell). Again, the present inventions may employ any adaptive charging technique now known or later developed—whether based on the charging characteristics of the battery or other elements of the system (for example, the charging circuitry and/or housing).

With reference to FIG. 13, the control circuitry may determine, assess and/or evaluate whether one or more charging parameters are out-of-specification and/or within-specification. In those instances when the control circuitry determines whether charging parameter data is/are out-of-specification, the control circuitry may instruct the source, induction coil in the battery powered device, the programmable rectifier (if any) and/or the programmable pulse shaping circuitry (if any) to adjust or change the characteristics of the charging pulses generated and output by the charging circuitry to the battery/cell. (See, for example, FIGS. 9B-9J and 10B-10E). For example, the control circuitry may instruct the source (which may be comprised of a plurality of sources—each of which may be enabled/disabled as well as programmable/fixed) to adjust or change so that the pulse width, amplitude and/or period of the current pulses output by the rectifier or pulse shaping circuitry are adjusted or changed in the battery powered device. Thus, in one embodiment, the control circuitry may adjust (i) the length of the rest period between pulses or packets, (ii) an amplitude of the charge and/or discharge pulses of the charge packets, and/or (iii) a width of the charge and/or discharge pulses of the charge packets (see, for example, FIGS. 14A, 14B, 15A and 15B) via instructions to one or more (or all) of the source, induction coil in the battery powered device, the programmable rectifier (if any) and/or the programmable pulse shaping circuitry (if any) to implement a given charging sequence and/or bring or maintain one or more operating parameters within-specification.

As discussed above, the wireless charging system may include switch circuitry to responsively connect or disconnect the battery/cell to/from the rectifier (or pulse shaping circuitry when implemented). In this way, the battery/cell may controllably receive charge pulses during the charging sequence or process. With reference to FIG. 16A, where the charging sequence includes discharge pulses (whether or not in connection with packets), the system, via the switch circuitry, may responsively connect or disconnect the battery/cell to a load (for example a resistor or active current sink (for example an FET)) to "generate" a discharge pulse (see, for example, FIGS. 11D, 11E, 12C-12G, 12I-12N, 14B). Notably, the switch circuitry, battery and load architecture may be implemented in any of the embodiments described and/or illustrated herein (including the illustrative embodiments of FIGS. 2-10E). For the sake of brevity, separate discussions and illustrates thereof are not be provided.

In another embodiment, the rectifier, in addition to generating rectified current and/or voltage pulses, may be configured or reconfigured to transmit current from the battery to the induction coil. In this regard, the rectifier may be a transmitter whereby the configuration of the charging circuitry is "reversed" such the battery is the "source". Indeed, such an embodiment may be employed to "generate" one or more discharge pulses and may be implemented in lieu of the switch circuitry, battery and load architecture or embodiment. Notably, the rectifier-transmitter architecture may be implemented in any of the embodiments described and/or illustrated herein (including the illustrative embodiments of FIGS. 2-10E, 16A and 16B). For the sake of brevity, separate discussions and illustrates of such embodiment implementing the rectifier-transmitter are not be provided.

There are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations. As such, the embodiments, features, attributes and advantages of the inventions described and illustrated herein are not exhaustive and it should be understood that such other, similar, as well as different, embodiments, features, attributes and advantages of the present inventions are within the scope of the present inventions. Indeed, the present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof.

For example, the pulses of the charge signal may be any shape (for example, rectangular, triangle, sinusoidal or square and/or the same shape and/or width or different shape and/or width. In one exemplary embodiment, the application of charging signals (for example, in packet form) to the battery/cell, relative to the charge packet, is periodic and/or in a predetermined sequence relative to the charge and/or discharge pulses. In another embodiment, the sequences charge and/or discharge pulses may be in a sequence which is partially or fully aperiodic which, may be determined and controlled by the control circuitry (for example, based on the operating conditions or characteristics of the battery/cell). Indeed, all combinations or permutations of pulse, pulse characteristics, periods, packets and signal characteristics and configurations of the pulses of the charge/discharge pulses and charge/discharge packets are intended to fall within the scope of the present inventions.

As mentioned above, reference herein to "one embodiment" or "an embodiment" means that a particular feature, structure, or characteristic described in connection with the embodiment can be included in one some or all of the embodiments of the present inventions. Importantly, the phrase "in one embodiment" "in another embodiment" and the like, throughout the specification, are not referring to the same embodiment, nor are separate or alternative embodiments necessarily mutually exclusive of other embodiments. Indeed, the present inventions are neither limited to any single aspect nor embodiment thereof, nor to any combinations and/or permutations of such aspects and/or embodiments. The same applies to the term "implementation."

Moreover, the battery/cell may be lithium ion technology/chemistry based battery/cell or other technology/chemistry (for example, lithium-cobalt dioxide, lithium-manganese dioxide, lithium-nickel dioxide and lithium-iron phosphate). The inventions described and/or illustrated herein may be implemented in conjunction with any battery or cell chemistries/technologies including, for example, silicon, lithium-ion, nickel-cadmium and other nickel metal hydride chemistries/technologies and lead acid. All battery or cell chemistries/technologies are intended to fall within the scope of the present inventions. It is to be understood that other embodiments may be utilized and operational changes may be made without departing from the scope of the present inventions. Indeed, the foregoing description of the exemplary embodiments of the inventions has been presented for the purposes of illustration and description. It is intended that the scope of the inventions not be limited solely to the description herein.

Further, as noted herein, the control circuitry may perform or execute one or more applications, routines, programs and/or data structures that implement particular methods, techniques, tasks or operations described and illustrated herein. The functionality of the applications, routines or programs may be combined or distributed (for example, when distributed among associated or related circuitry, such circuitry is, in combination, control circuitry). Moreover, the control circuitry of the present inventions, or portions thereof, and/or one some or all of the functions or operations performed thereby, may be incorporated into circuitry in the charge base or the battery powered device. Moreover, certain functions or operations of the control circuitry may be distributed or performed by the control circuitry in the base and control circuitry in the battery powered device. In one embodiment, this circuitry may be disposed on a substrate which is/are physically disposed on, integrated with and/or fixed to the battery/cell. In another embodiment, such circuitry may be disposed on/in, integrated with and/or fixed to a separate substrate; all of which are intended to fall within the scope of the inventions.

As mentioned above, the inventions are not limited to processes and/or algorithms implemented in accordance with the flow chart of FIG. 13. Such flow chart of operation is merely exemplary.

At times, the terms battery and cell have been employed interchangeably to mean an electrical storage device that may be electrically charged and discharged. Such a device may include a single electrical cell, or may include several cells electrically connected in series and/or parallel to form a battery of larger electrical capacity. It shall be noted that the embodiments described herein shall apply to either cells or batteries, as a single unit or multiple units electrically configured into a larger battery pack, regardless of configuration (i.e., connected in series and/or parallel). Such battery pack may include separate monitor circuitry, as described herein, for each cell or a subset of cells, or for the entire battery. Moreover, control circuitry may be implemented in the same manner (i.e., control circuitry dedicated to each cell or a subset of cells, or for the entire battery. Any of the embodiments of the monitor circuitry and control circuitry described herein may be implemented in such multi-cell configurations. Indeed, all combinations and permutations thereof are intended to fall within the scope of the present invention.

Notably, a "circuit" means, among other things, a single component (for example, electrical/electronic) or a multiplicity of components (whether in integrated circuit form, discrete form or otherwise), which are active and/or passive, and which are coupled together to provide or perform a desired operation. In addition, "circuitry", means, among other things, a circuit (whether integrated or otherwise), a group of such circuits, one or more processors, one or more state machines, one or more processors implementing software, one or more gate arrays, programmable gate arrays and/or field programmable gate arrays, or a combination of one or more circuits (whether integrated or otherwise), one or more state machines, one or more processors, one or more processors implementing software, one or more gate arrays, programmable gate arrays and/or field programmable gate arrays. The term "data" means, among other things, a current or voltage signal(s) (plural or singular) whether in an analog or a digital form, which may be a single bit (or the like/equivalent) or multiple bits (or the like/equivalent).

It should be further noted that the various circuits and circuitry disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and HDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Indeed, when received within a computer system via one or more computer-readable media, such data and/or instruction-based expressions of the herein described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a fabrication process.

Moreover, the various circuits and circuitry, as well as techniques, disclosed herein may be represented via simulations using computer aided design and/or testing tools. The simulation of the charging circuitry, control circuitry and/or monitor circuitry, and/or techniques implemented thereby, may be implemented by a computer system wherein characteristics and operations of such circuitry, and techniques implemented thereby, are imitated, replicated and/or predicted via a computer system. The present inventions are also directed to such simulations of the inventive charging circuitry, control circuitry and/or monitor circuitry, and/or techniques implemented thereby, and, as such, are intended to fall within the scope of the present inventions. The computer-readable media corresponding to such simulations and/or testing tools are also intended to fall within the scope of the present inventions.

Further, unless explicitly stated otherwise, each numerical value and range should be interpreted as being approximate as if the word "about" or "approximately" preceded the value of the value or range.

The term "determine" and other forms (i.e., determining, determined and the like) means, among other things, calculate, assesses, determine and/or estimate and other forms thereof. Further, the term "battery" means an individual cell (which stores energy) and/or a plurality of cells arranged electrically in a series and/or parallel configuration. The term "out-of-specification" means the parameter data (for example, the voltage, current and/or temperature data) is greater than a predetermined upper limit, less than a predetermined lower limit and/or outside a predetermined range. The term "within-specification" and "in-specification", collectively as "in-specification", means the data is not "out-of-specification".

In addition, the terms "first," "second," and the like, herein do not denote any order, quantity, or importance, but rather are used to distinguish one element from another. Moreover, the terms "a" and "an" herein do not denote a limitation of quantity, but rather denote the presence of at least one of the referenced item. Further, the term "data" may mean, among other things, a current or voltage signal(s) whether in analog or a digital form (which may be a single bit (or the like) or multiple bits (or the like)).

As stated above, the techniques and circuitry of the present inventions may employ one or more (or all) of the charging sequences, operations and/or processes described and/or illustrated in the U.S. patent application Ser. Nos. 13/111,902, 13/167,782, 13/366,352, 13/626,605, 13/657,841, 13/747,914, 13/836,235, 14/003,826, 14/075,667 and/or 14/252,422—all of which are hereby incorporated by reference. Moreover, the present inventions may implement any adaptive charging techniques now known or later developed (including those described and/or illustrated in the aforementioned applications).

What is claimed is:

1. A wireless charging system for charging a battery, the wireless charging system comprising:
    wireless charging circuitry to charge the battery from a power source, wherein the wireless charging circuitry is based on inductive coupling, wherein the wireless charging circuitry includes a programmable rectifier that is configured to apply at least one of a current or a voltage to the battery, wherein the programmable rectifier includes full-wave and half-wave rectifier circuitry;
    monitor circuitry configured to monitor voltage data between terminals of the battery;
    control circuitry coupled to the monitor circuitry, the programmable rectifier, and the power source, wherein the control circuitry is configured to provide the power source with one or more control signals and provide the programmable rectifier with one or more additional control signals to select between generating a plurality of pulses via the full-wave rectifier circuitry in the programmable rectifier or generating a plurality of pulses via the half-wave rectifier circuitry in the programmable rectifier based on one or more of the following characteristics: an overpotential (OP) of the battery characterized as a difference in the monitored voltage between when a charge signal is initiated and when the battery reaches full equilibrium, a full relaxation time (FRT) of the battery, a charge pulse voltage (CPV) of the battery, a change in CPV of the battery, a partial relaxation time (PRT) of the battery, a temperature of the battery ($T°$ b/c), and a swelling of the battery; and
    further wherein the wireless charging circuitry comprises programmable pulse shaping circuitry electrically coupled between the programmable rectifier and the terminals of the battery, and the pulse shaping circuitry provides modification of characteristics of the plurality of pulses output by the programmable rectifier based on one or more of the following characteristics: the OP of the battery, the FRT of the battery, the CPV of the battery, the change in CPV of the battery, the PRT of the battery, the temperature of the battery, and the swelling of the battery.

2. The wireless charging system of claim 1, wherein the control circuitry is configured to adaptively control at least one of a full-wave rectified current, a full-wave rectified voltage, a half-wave rectified current, a half-wave rectified voltage, voltage, current, or voltage pulses applied to the battery.

3. The wireless charging system of claim 1, wherein the control circuitry is configured to provide the power source with one or more control signals and provide the programmable rectifier with one or more additional control signals based on a charge pulse voltage (CPV) of the battery or a change in CPV of the battery.

4. The wireless charging system of claim 1, wherein the control circuitry is disposed in at least one of a charge base or in a battery powered device.

5. The wireless charging system of claim 1, wherein the control circuitry is configured to produce the control signals based on one or more operating conditions of the charging circuitry.

6. The wireless charging system of claim 5, wherein the one or more operating conditions is selected based on at least one of operating temperature of one or more charging circuits of the wireless charging circuitry, operating efficiency of one or more of the charging circuits of the wireless charging circuitry, or an operating temperature of the housing ($T°$ h).

7. The wireless charging system of claim 1, wherein the control circuitry is configured to communicate with other circuitry or elements of the wireless charging system via wireless communication.

8. The wireless charging system of claim 7, further comprising induction coils or a transmission link for providing the wireless communication.

9. The wireless charging system of claim 1, wherein the wireless charging circuitry further comprises a source coil configured to generate an alternating electromagnetic field.

10. The wireless charging system of claim 9, wherein the wireless charging circuitry further comprises an induction coil, which converts power from the electromagnetic field into electrical current.

11. The wireless charging system of claim 10, wherein the induction coil is disposed in a battery powered device that includes the battery, and wherein the source coil is disposed in a charge base that includes the power source.

12. The wireless charging system of claim 11, wherein the control circuitry is configured to control at least one of the source coil or the induction coil.

13. The wireless charging system of claim 1, wherein the monitor circuitry is configured to provide the control circuitry with data representing at least one of charging conditions of the battery, circuitry, or a housing of the wireless charging system during charging.

14. The wireless charging system of claim 13, wherein the monitor circuitry comprises at least one of one or more voltage sensors or one or more current sensors configured to determine, measure, or monitor a respective voltage at the terminals of the battery or a respective current through the battery during the charging.

15. The wireless charging system of claim 1, wherein the control circuitry is configured to provide the power source with one or more control signals and provide the programmable rectifier with one or more additional control signals based on a swelling of the battery.

16. The wireless charging system of claim 1, wherein the wireless charging circuitry does not include a current or voltage switching regulator electrically coupled between the full-wave or half-wave rectifier and the output of the charging circuitry.

17. A wireless charging method for charging a battery, the method comprising:
   inductively coupling at least one of current or voltage between a source coil and induction coil;
   rectifying, by a programmable rectifier, the current or voltage from the induction coil and applying the rectified current or voltage to the battery, wherein the programmable rectifier includes full-wave and half-wave rectifier circuitry;
   monitoring voltage data between terminals of the battery; and
   providing the programmable rectifier with one or more control signals to select between generating a plurality of pulses via the full-wave rectifier circuitry in the programmable rectifier or generating a plurality of pulses via the half-wave rectifier circuitry in the programmable rectifier based on one or more of the following characteristics: an overpotential (OP) of the battery characterized as a difference in the monitored voltage between when a charge signal is initiated and when the battery reaches full equilibrium, a full relaxation time (FRT) of the battery, a charge pulse voltage (CPV) of the battery, a change in CPV of the battery, a partial relaxation time (PRT) of the battery, a temperature of the battery (T° b/c), and a swelling of the battery; and
   modifying characteristics of the plurality of pulses output by the programmable rectifier using programmable pulse shaping circuitry electrically coupled between the programmable rectifier and the terminals of the battery based on one or more of the following characteristics: the OP of the battery, the FRT of the battery, the CPV of the battery, the change in CPV of the battery, the PRT of the battery, the temperature of the battery, and the swelling of the battery.

18. The wireless charging method of claim 17, wherein the programmable rectifier is adaptively controlled to output at least one of a full-wave rectified current, a full-wave rectified voltage, a half-wave rectified current, a half-wave rectified voltage, voltage, current, or voltage pulses applied to the battery.

19. The wireless charging system of claim 1, wherein the programmable rectifier includes a diode bridge having switch circuitry to switch an output of the programmable rectifier between a full-wave rectified current or voltage and a half-wave rectified current or voltage.

* * * * *